(12) United States Patent
Hisada et al.

(10) Patent No.: US 8,414,451 B2
(45) Date of Patent: Apr. 9, 2013

(54) DRIVING DEVICE FOR VEHICLE

(75) Inventors: Hideki Hisada, Kawasaki (JP); Masaki Yoshida, Okayaki (JP)

(73) Assignee: Aisin Aw Co., Ltd., Anjo (JP)

( * ) Notice: Subject to any disclaimer, the term of this patent is extended or adjusted under 35 U.S.C. 154(b) by 0 days.

(21) Appl. No.: 13/430,060

(22) Filed: Mar. 26, 2012

(65) Prior Publication Data
US 2012/0244992 A1    Sep. 27, 2012

(30) Foreign Application Priority Data

Mar. 25, 2011  (JP) ................................ 2011-068145

(51) Int. Cl.
- *B60W 10/02*     (2006.01)
- *B60W 10/06*     (2006.01)
- *B60W 10/08*     (2006.01)
- *F16H 3/72*      (2006.01)

(52) U.S. Cl.
USPC .................................................. 477/5; 475/5

(58) Field of Classification Search .......... 477/5; 475/2, 475/5, 150, 151, 153
See application file for complete search history.

(56) References Cited

U.S. PATENT DOCUMENTS

| | | | | |
|---|---|---|---|---|
| 7,294,938 B2 * | 11/2007 | Miyao | ............................. | 290/45 |
| 7,698,042 B2 * | 4/2010 | Shimizu et al. | ................. | 701/51 |
| 2005/0023055 A1 | 2/2005 | Imazu et al. | | |
| 2005/0283283 A1 * | 12/2005 | Hisada et al. | ................... | 701/22 |
| 2010/0125021 A1 * | 5/2010 | Matsubara et al. | ............... | 477/5 |

FOREIGN PATENT DOCUMENTS

| | | |
|---|---|---|
| JP | A-2005-48805 | 2/2005 |
| JP | A-2010-76678 | 4/2010 |

OTHER PUBLICATIONS

Mar. 19, 2012 International Search Report issued in PCT/JP2012/054778 (with English-language translation).

* cited by examiner

*Primary Examiner* — Edwin A Young
(74) *Attorney, Agent, or Firm* — Oliff & Berridge, PLC

(57) ABSTRACT

A driving device with an input member connected to an engine, an output member connected to wheels, first and second rotating electrical machines, a differential gear unit including at least three rotational elements, and a control device. The control device includes a differential rotation reducing control, an engagement control, and a start up control that changes the rotation speed of the first rotating electrical machine, which allows the internal combustion engine to have a rotation speed at which starting is possible, made as a target value, when in direct engagement. The differential rotation reducing control changes the rotation speed of the first rotating electrical machine with the upper limit and the lower limit of a starting torque output range, which is a rotation speed range in which the torque necessary for starting the internal combustion engine may be output by the first rotating electrical machine, made as limits.

20 Claims, 23 Drawing Sheets

DRIVING DEVICE FOR VEHICLE

INCORPORATION BY REFERENCE

The disclosure of Japanese Patent Application No. 2011-068145 filed on Mar. 25, 2011, including the specification, drawings and abstract thereof, is incorporated herein by reference in its entirety.

BACKGROUND OF THE INVENTION

1. Field of the Invention

The present invention relates to a driving device for a vehicle, which is provided with an input member that is connected in a driving manner to an internal combustion engine, an output member that is connected in a driving manner to wheels, a first rotating electrical machine, a second rotating electrical machine, a differential gear unit including at least three rotational elements, and a control device.

2. Description of the Related Art

For example, a technology disclosed in JP-A-2010-76678 may be exemplified as a driving device for a vehicle as described above in the related art. JP-A-2010-76678 discloses a configuration in which the differential gear unit includes a planetary gear mechanism having three rotational elements, the first rotating electrical machine is connected in a driving manner to a sun gear, the input member is connected in a driving manner to a carrier, and the second rotating electrical machine and the output member are connected in a driving manner to a ring gear. In addition, the driving device for a vehicle includes a frictional engagement device that is capable of releasing the connection in a driving manner between the carrier and the input member (internal combustion engine), such that the internal combustion engine is detachable during executing an electric traveling mode in which a vehicle is made to travel by torque of the second rotating electrical machine in a state in which the internal combustion engine is stopped. Therefore, during executing the electric traveling mode, the rotation speed of the sun gear (the first rotating electrical machine) or the carrier may be set independently from a vehicle speed. As a result, for example, as disclosed in JP-A-2010-76678, the carrier is made to rotate by actively controlling the rotation speed of the first rotating electrical machine, and auxiliary machines may be driven using the rotation of the carrier.

In the configuration disclosed in JP-A-2010-76678, when the electric traveling mode is switched to a split traveling mode in which the torque of the internal combustion engine is used to drive, the rotation speed of the internal combustion engine is made to increase to a rotation speed at which ignition is possible by torque of the first rotating electrical machine. Specifically, as disclosed in paragraphs 0073 to 0076 of JP-A-2010-76678, the rotation speed of the carrier is decreased by decreasing the rotation speed of the first rotating electrical machine, and in a state where the rotation speed of the carrier becomes equal to zero that is a rotation speed of the internal combustion engine (in a state indicated by a bold broken line in FIG. 9 of the literature), the frictional engagement device is switched from a release state to a direct engagement state. Then, the rotation speed of the internal combustion engine is increased by the torque of the first rotating electrical machine, and the internal combustion engine is started up by the ignition in a state in which the rotation speed of the internal combustion engine is equal to or higher than the rotation speed at which the ignition is possible (in a state indicated by a bold solid line in FIG. 9). In this manner, the transition from the electric traveling mode to the split traveling mode may be realized.

However, as is clear from FIG. 9, the rotation speed of the first rotating electrical machine, in a state in which the rotation speed of the carrier and the rotation speed of the internal combustion engine become equal to each other, is determined in response to the vehicle speed. That is, the higher the vehicle speed, the larger an absolute value of the rotation speed of the first rotating electrical machine in the state. In addition, the magnitude of the maximum torque, which may be generated by the rotating electrical machine, is apt to be small, as the absolute value of the rotation speed becomes large. Therefore, in the configuration of JP-A-2010-76678, the torque of the first rotating electrical machine may be deficient depending on the magnitude of the vehicle speed with respect to the torque necessary to increase the rotation speed of the internal combustion engine, such that there is a concern in that the internal combustion engine may not be started up, or vibration may occur at the time of starting up the internal combustion engine.

In addition, in the paragraphs 0067 to 0068 of JP-A-2010-76678, there is disclosed a configuration in which at the time of the switching from the electric traveling mode to the split traveling mode, the engagement of the frictional engagement device is made while being slid so as to be switched into a direct engagement state in a state in which the rotation speed of the first rotating electrical machine is not decreased and a difference in the rotation speed between the carrier and the internal combustion engine is relatively large. However, as is clear from FIG. 9, since the higher the vehicle speed, the larger the difference between the rotation speed of the carrier and the rotation speed (zero) of the internal combustion engine, the difference in the rotation speed becomes too large depending on the magnitude of the vehicle speed, such that there is a concern in that an increase in the temperature of the frictional engagement device becomes too high, or the time necessary for the engagement is too long.

SUMMARY OF THE INVENTION

Therefore, it is preferable to realize a driving device for a vehicle, which is capable of suitably starting up an internal combustion engine even in a state in which a vehicle speed is high.

According to the invention, there is provided a driving device for a vehicle, which is provided with an input member that is connected in a driving manner to an internal combustion engine, an output member that is connected in a driving manner to wheels, a first rotating electrical machine, a second rotating electrical machine, a differential gear unit including at least three rotational elements, and a control device, wherein the input member, the output member, and the first rotating electrical machine are connected in a driving manner to the rotational elements, which are different from each other, of the differential gear unit, not through another rotational element of the differential gear unit; the second rotating electrical machine is connected in a driving manner to one of the rotational elements of the differential gear unit other than the rotational element to which the first rotating electrical machine is connected in a driving manner, not through another rotational element of the differential gear unit; the driving device includes a frictional engagement device that is capable of releasing the connection in a driving manner between any of the input member, the output member, and the first rotating electrical machine, and the rotational elements of the differential gear unit; the control device includes a differential rotation reducing control unit that performs a differential rotation reducing control to change a rotation speed of the first rotating electrical machine in such a manner that the difference in the rotation speed, between two engagement members, which engage with each other, in the frictional engagement device becomes small, when the internal combustion engine is started up from a state in which the frictional engagement device enters a released state, the internal combustion engine is stopped, and the output member rotates; an engagement control unit that performs a non-synchronization engagement control that allows the frictional engagement device to engage, in a non-synchronization state in which the difference in the rotation speed between the two engagement members is equal to or greater than a threshold value of the differential rotation, on condition of the performing of the differential rotation reducing control, and that allows the frictional engagement device to be a direct engagement state that is an engagement state in which the differential rotation is not present between the two engagement members, and a starting up control unit that changes the rotation speed of the first rotating electrical machine with the rotation speed of the first rotating electrical machine, which allows the internal combustion engine to have the rotation speed at which the starting up is possible, made as a target value, on condition of being in the direct engagement state; and the differential rotation reducing control unit changes the rotation speed of the first rotating electrical machine with the upper limit and the lower limit of a starting up torque outputable range, which is a rotation speed range in which the starting up torque necessary for the starting up of the internal combustion engine may be output by the first rotating electrical machine, made as limits.

In the present application, "connected in a driving manner" represents a state in which two rotational elements are connected in such a manner that a driving power may be transmitted, and is used as a concept including a state in which the two rotational elements are connected to integrally rotate, or a state in which the two rotational elements are connected in such a manner that the driving power may be transmitted through one or two or more power transmission members. As these power transmission members, various members that transmit rotation with the same speed or after converting the speed thereof, for example, a shaft, a gear mechanism, a belt, a chain, or the like may be included. In addition, as these power transmission members, an engagement element, which selectively transmits the rotation and a driving power, for example, a frictional engagement element, a gear engagement type engagement element, or the like may be included. In addition, "driving force" is used with the same meaning as "torque".

In addition, in the present application, a differential gear mechanism including three rotational elements, for example, a planetary gear mechanism including a sun gear, a carrier, and a ring gear is used, a unit, which is obtained by the differential gear mechanism alone or by a composition of a plurality of differential gear mechanisms, is referred to as a differential gear unit.

In addition, in the present application, "rotating electrical machine" is used as a concept to include a motor (an electric motor), a generator (an electricity generator), and a motor and generator performing the functions of both the motor and generator as necessary.

According to the above-described characteristic configuration, since at the time of starting up the internal combustion engine, the non-synchronization engagement control is performed after performing the differential rotation reducing control, the non-synchronization engagement control may be performed in a state in which a difference in a rotation speed between two engagement members of the frictional engagement device become small, compared to a case in which the non-synchronization engagement control is performed without performing the differential rotation reducing control. Therefore, it is possible to switch the frictional engagement device into a direct engagement state while suppressing occurrence of a problem such as a reduction in an expected life span or the like, which is caused because an increase in the temperature of the frictional engagement device becomes too high, or the time necessary for the engagement is too long.

At this time, since in the differential rotation reducing control, the rotation speed of the first rotating electrical machine is controlled with the upper limit and the lower limit of a starting up torque outputable range made as limits, the difference in the rotation speed between the two engagement members may be small within a range in which the internal combustion engine may be appropriately started up. That is, even when a vehicle speed is high, it is possible to appropriately avoid the problem, which is caused because the difference in the rotation speed at the time of the engagement of the frictional engagement device is large, while securing a reliable starting up of the internal combustion engine.

In addition, it is not necessary to limit the rotation speed (that is, the vehicle speed) of the output member during a drive to a predetermined value (for example, a rotation speed at which the maximum torque, which can be generated by the first rotating electrical machine in a state in which the two engagement members are synchronized with each other, is equal to a starting up torque) or less, the upper limit of the vehicle speed that is permitted in a state in which the internal combustion engine is stopped may be increased, and therefore the energy efficiency of a vehicle may be improved.

Here, in a case where the rotation speed of the first rotating electrical machine, which is to realize a synchronization state in which the difference in the rotation speed between the two engagement members is less than the threshold value of the differential rotation, is beyond the upper limit or the lower limit, the differential rotation reducing control unit may change the rotation speed of the first rotating electrical machine with one of the upper limit and the lower limit made as the target value.

According to this configuration, it is possible to make the difference in the rotation speed between the two engagement members as small as it can be within a range in which the internal combustion engine may be appropriately started up. Therefore, it is possible to more reliably avoid the problem, which is caused because the difference in the rotation speed at the time of the engagement of the frictional engagement device is large, while securing a reliable starting up of the internal combustion engine.

In addition, in a case where the rotation speed of the first rotating electrical machine, which is to realize the synchronization state in which the difference in the rotation speed between the two engagement members is less than the threshold value of the differential rotation, is within the starting up torque outputable range, the differential rotation reducing control unit may change the rotation speed of the first rotating electrical machine so as to realize the synchronization state, and the engagement control unit may perform a synchronization engagement control, which allows the frictional engagement device to engage in the synchronization state instead of the non-synchronization engagement control, so as to make the frictional engagement device become the direct engagement state.

According to this configuration, in a case where it is possible to allow the two engagement members to be in the synchronization state within a range in which the internal combustion engine may be appropriately started up, the synchronization engagement control is performed instead of the non-synchronization engagement control. Therefore, it is possible to suppress that the non-synchronization engagement control is performed more often than necessary, and therefore the durability of the frictional engagement device may be improved.

In addition, as the non-synchronization engagement control, the engagement control unit may reduce the difference in the rotation speed between the two engagement members in a slip engagement state in which the two engagement members engage with each other with the difference in the rotation speed present so as to realize the direct engagement state, on condition of being in the synchronization state, in which the difference in the rotational speed between the two engagement members is less than the threshold value of the differential rotation.

According to this configuration, it is possible to suppress that an engagement shock occurs at the time of performing the non-synchronization engagement control.

In the configuration in which as the non-synchronization engagement control, the engagement control unit reduces the difference in the rotation speed between the two engagement members in the slip engagement state and performs the control to realize the direction engagement state, on condition of being in the synchronization state, the engagement control unit may set a transmission torque capacity of the frictional engagement device, which allows the frictional engagement device to be the slip engagement state, based on a target change ratio of the rotation speed of the internal combustion engine and an inertia moment of the internal combustion engine.

According to this configuration, it is possible to quickly increase the rotation speed of the internal combustion engine in response to the target change ratio, at the time of performing the non-synchronization engagement control. Therefore, in a case where a damper is provided between the internal combustion engine and the driving device for a vehicle, it is possible to come out from a resonance region of the damper, such that it is possible to suppress that vibration occurs due to the resonance of the damper.

In addition, in the driving device for a vehicle having each of the above-described configurations, the first rotating electrical machine may be configured to generate torque by electric power supplied from an electricity storage device, and may be configured in such a manner that the maximum torque, which may be generated in response to the rotation speed of the first rotating electrical machine and a state of the electricity storage device, becomes different in each case, and the starting up torque outputable range may be set to be variable in response to the state of the electricity storage device.

According to this configuration, it is possible to minimize the difference in the rotation speed between the two engagement members of the frictional engagement device in response to the state of the electricity storage device, such that the durability of the frictional engagement device may be improved to realize long lifespan.

In addition, the second rotating electrical machine may be connected in a driving manner to the rotational element, to which the output member is connected in a driving manner, of the differential gear unit, not through another rotational element of the differential gear unit.

According to this configuration, even when a member in which the connection in a driving manner with the rotational element of the differential gear unit may be released by the frictional engagement device is set to any of the input member, the output member, and the first rotating electrical machine, it is possible to realize the electric traveling mode in which the torque of the second rotating electrical machine is transmitted to the output member to drive wheels in a state in which the internal combustion engine is stopped. Therefore, a degree of freedom in design with respect to disposition of the frictional engagement device may increase, such that it is possible to broadly apply the driving device for a vehicle according to the invention.

For example, as a configuration that is provided to the frictional engagement device so as to realize the release of the connection in a driving manner between the input member and the rotational element of the differential gear unit, the differential gear unit may include three rotational elements that are a first rotational element, a second rotational element, and a third rotational element in the order of rotation speed, the first rotating electrical machine may be connected in a driving manner to the first rotational element, the input member may be connected in a driving manner to the second rotational element, and the second rotating electrical machine and the output member may be connected in a driving manner to the third rotational element, not through another rotational element of the differential gear unit, and the frictional engagement device may be provided in a power transmission path between the input member and the second rotational element.

In addition, "order of rotation speed" may be either an order from the high speed side to the low speed side or an order from the low speed side to the high speed side, and may be any of the orders depending on a rotation state of each differential gear mechanism, but in any of these cases, the order of the rotational elements is not changed.

On the other hand, as a configuration in which the second rotating electrical machine is connected in a driving manner to one of the rotational elements of the differential gear unit other than the rotational element to which the output member is connected in a driving manner, not through another rotational element of the differential gear unit, the differential gear unit may include four rotational elements that are a first rotational element, a second rotational element, a third rotational element, and a fourth rotational element in the order of rotation speed, the input member, the output member, the first rotating electrical machine, and the second rotating electrical machine may be connected in a driving manner to the rotational elements, which are different from each other, of the differential gear unit, not through another rotational element of the differential gear unit, and the frictional engagement device may be provided in a power transmission path between the input member and the rotational element, to which the input member is connected in a driving manner not through another rotational element, of the differential gear unit.

According to this configuration, it is possible to realize the electric traveling mode in which the torque of the second rotating electrical machine is transmitted to the output member so as to drive the wheels in a state in which the internal combustion engine is stopped.

DETAILED DESCRIPTION OF THE EMBODIMENTS

1. First Embodiment

Figure 1:
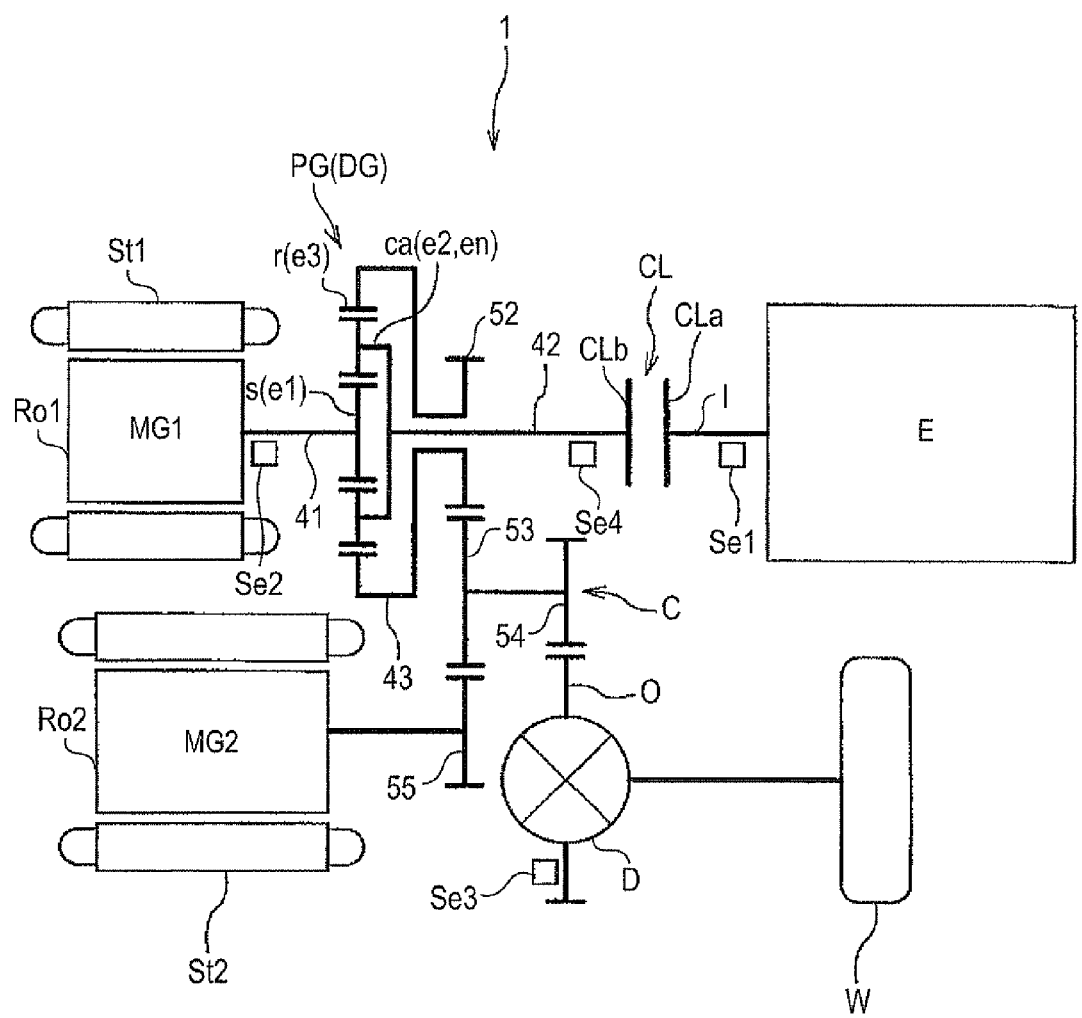
FIG. 1 is a skeleton diagram illustrating a mechanical configuration of a driving device for a vehicle according to a first embodiment of the invention.

A first embodiment of a driving device for a vehicle according to the invention will be described with reference to the attached drawings. As shown in FIG. 1, the driving device 1 for a vehicle according to this embodiment is configured by a driving device (driving device for a hybrid car) to drive a vehicle (a hybrid car) including both an internal combustion engine E and rotating electrical machines MG1 and MG2 as a driving power source for wheels. In addition, the driving device 1 for a vehicle according to this embodiment includes a control device 70 (refer to FIG. 2) and this control device 70 controls an operation of each driving power source and a frictional engagement device CL on the basis of a system configuration shown in FIG. 2. In addition, in FIG. 2, broken lines represent transmission paths of electric power, and solid line arrows represent transmission paths of various pieces of information.

As shown in FIG. 1, in this embodiment, a differential gear unit DG, which is provided to the driving device 1 for a vehicle, is configured by a planetary gear mechanism PG including a sun gear s, a carrier ea, and a ring gear r as rotational elements. In addition, a first rotating electrical machine MG1 is connected in a driving manner to the sun gear s, an input member I is connected in a driving manner to the carrier ca, and a second rotating electrical machine MG2 and an output member O are connected in a driving manner to the ring gear r not through another rotational element of the planetary gear mechanism PG. In addition, the input member I is connected in a driving manner to the internal combustion engine E, and the output member O is connected in a driving manner to wheels W.

In addition, the driving device 1 for a vehicle includes a frictional engagement device CL that is capable of releasing the connection in a driving manner between the input member I and the carrier ca. Here "releasing of the connection in a driving manner" represents that the connection state between the two rotational elements that are connected in a driving manner is changed into a state (non-connection state) in which the transmission of the driving power is not performed between the two rotational elements. Therefore, when performing an electric traveling mode (EV traveling mode) in which output torque of the second rotating electrical machine MG2 is transmitted to the output member O to drive the wheels W in a state in which the internal combustion engine E is stopped, the internal combustion engine E may be detached, such that an improvement in energy efficiency due to avoiding of idling (dragging) of the first rotating electrical machine MG1, a driving of an auxiliary machine (for example, an oil pump or the like) by using rotation of the carrier ca, or the like may be realized. Hereinafter, a configuration of the driving device 1 for a vehicle according to this embodiment will be described in detail.

1-1. Mechanical Configuration of Driving Device for Vehicle

First, a mechanical configuration of the driving device 1 for a vehicle according to this embodiment will be described. The driving device 1 for a vehicle includes the input member I that is connected in a driving manner to the internal combustion engine E, the output member O that is connected in a driving manner to the wheels W, the first rotating electrical machine MG1, the second rotating electrical machine MG2, and the differential gear unit DG including at least three rotational elements, and a control device 70. In addition, the driving device 1 for a vehicle according to this embodiment is configured by a so-called two-motor split type driving device for a hybrid car, which includes the differential gear unit DG for power distribution that distributes the output torque of the internal combustion engine E to the first rotating electrical machine MG1 side, the wheels W, and the second rotating electrical machine MG2 side.

As shown in FIG. 1, in this embodiment, the differential gear unit DG is configured by a single pinion type planetary gear mechanism PG. That is, the differential gear unit DG includes three rotational elements in this example. In addition, when it is assumed that in the order of rotation speed (that is, in the order of disposition in a speed diagram (collinear diagram)), these three rotational elements are set in the order of a first rotational element e1, a second rotational element e2, and a third rotational element e3, in this embodiment, the sun gear s of the planetary gear mechanism PG makes up the first rotational element e1, the carrier ca of the planetary gear mechanism PG makes up the second rotational element e2, and the ring gear r of the planetary gear mechanism PG makes up the third rotational element e3.

As described below, the input member I, the output member O, and the first rotating electrical machine MG1 are connected in a driving manner to the rotational elements, which are different from each other, of the differential gear unit DG, not through another rotational element of the differential gear unit DG. In addition, the second rotating electrical machine MG2 is connected in a driving manner to one of the rotational elements of the differential gear unit DG other than the rotational element to which the first rotating electrical machine MG1 is connected in a driving manner, not through another rotational element of the differential gear unit DG. In addition, the driving device 1 for a vehicle includes the frictional engagement device CL that is capable of releasing the connection in a driving manner between any of the input member I, the output member O, and the first rotating electrical machine MG1, and the rotational elements of the differential gear unit DG.

In addition, a rotational element connecting member that rotates integrally with the rotational element is connected to each of the rotational elements of the differential gear unit DG. Specifically, as shown in FIG. 1, a first rotational element connecting member 41 is connected to the sun gear s as the first rotational element e1, a second rotational element connecting member 42 is connected to the carrier ca as the second rotational element e2, and a third rotational element connecting member 43 is connected to the ring gear r as the third rotational element e3. In addition, each of the input member I, the output member O, the first rotating electrical machine MG1, and the second rotating electrical machine MG2 is connected in a driving manner to any of the rotational element connecting members, and thereby is connected in a driving manner to any of the rotational elements of the differential gear unit DG.

The input member I is connected in a driving manner to the internal combustion engine E. In this embodiment, the input member I is configured by a shaft member (input shaft). Here, the internal combustion engine E is a motor that outputs power by combustion of a fuel, and may use, for example, a spark ignition engine such as a gasoline engine, a compression ignition engine such as a diesel engine, or the like. The input member I is connected in a driving manner to an output shaft of the internal combustion engine, for example, a crank shaft of the internal combustion engine E or the like. In this embodiment, the input member I is connected in a driving manner to the output shaft of the internal combustion engine to rotate integrally therewith, such that a rotation speed of the input member I becomes equal to that of the internal combustion engine E. In addition, the internal combustion engine E may be appropriately connected in a driving manner to the input member I through another device such as a damper and a fly wheel.

The output member O is connected in a driving manner to the wheels W. In this embodiment, the output member O is configured by a gear member, and specifically, is configured by a differential input gear that is provided to a differential gear unit D for output. In this example, the differential gear unit D for output is configured by a differential gear mechanism using a plurality of bevel gears that engage with each other, and the torque transmitted to the output member O is distributed to left and right wheels W that serve as driving wheels.

The first rotating electrical machine MG1 includes a first stator St1 that is fixed to a casing (not shown), and a first rotor Ro1 that is rotatably supported at an inner side in a radial direction of the first stator St1. The second rotating electrical machine MG2 includes a second stator St2 that is fixed to a casing (not shown), and a second rotor Ro2 that is rotatably supported at an inner side in a radial direction of the second stator St2. The second rotor Ro2 is connected in a driving manner to a second rotating electrical machine output gear 55 to rotate integrally therewith through a second rotor shaft to which the second rotor Ro2 is fixed.

Figure 2:
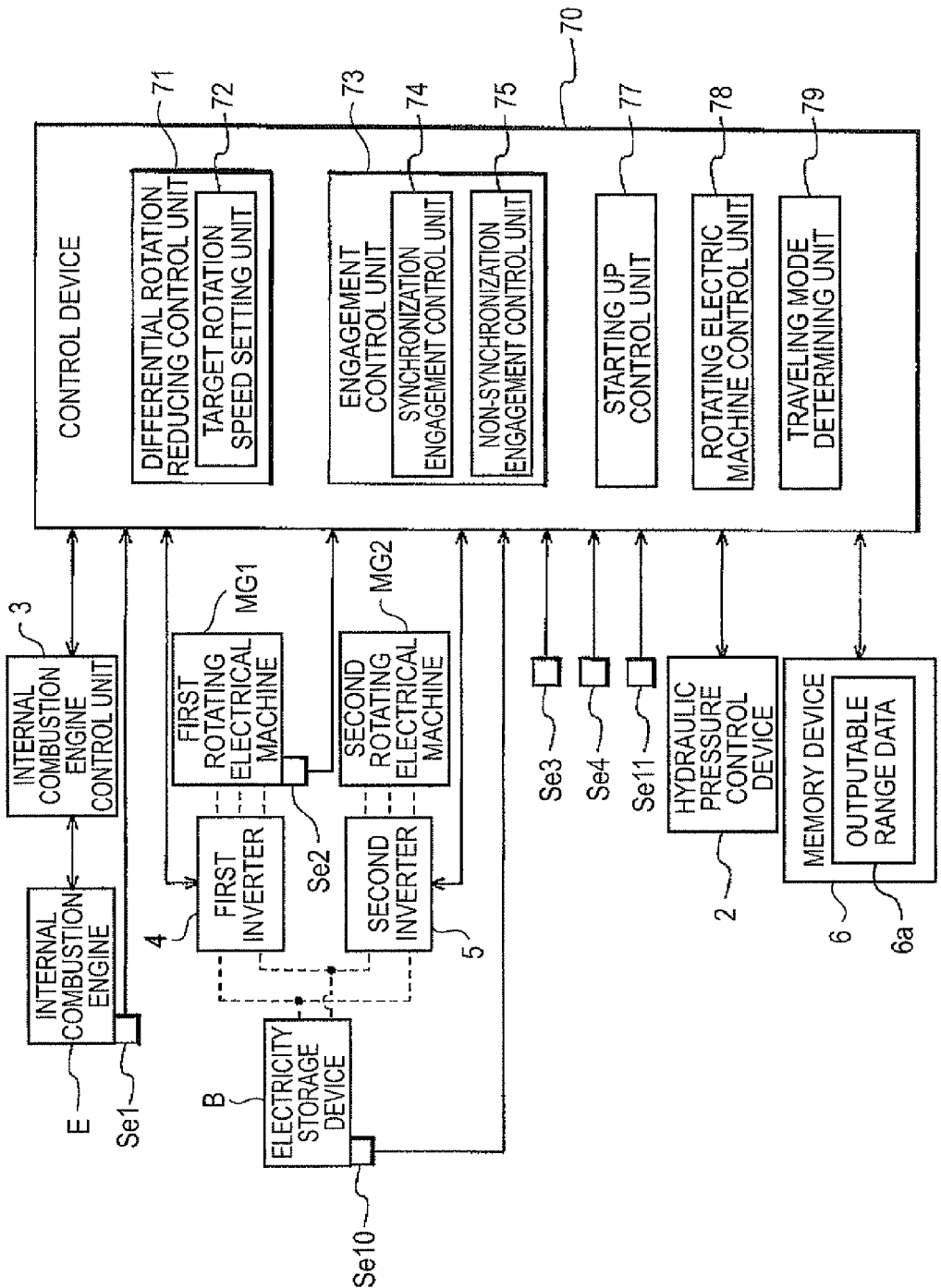
FIG. 2 is a schematic diagram illustrating a system configuration of the driving device for a vehicle according to the first embodiment of the invention.

As shown in FIG. 2, the first rotating electrical machine MG1 is electrically connected to an electricity storage device B through a first inverter 4, and the second rotating electrical machine MG2 is electrically connected to the electricity storage device B through a second inverter 5. As the electricity storage device B, various well known electricity storage devices such as a battery and a capacitor may be used. In addition, in this embodiment, each of the first rotating electrical machine MG1 and the second rotating electrical machine MG2 may perform a function as a motor (electric motor) to which electric power is supplied from the electricity storage device B and which generates power (torque), and a function as a generator (electricity generator) to which the power is supplied to generate the electricity power, and which supplies the generated electricity power to the electricity storage device B.

The frictional engagement device CL is a device that includes two engagement members, and that selectively driving-connects a member connected in a driving manner to a first engagement member CLa that is one engagement member and a member connected in a driving manner to a second engagement member CLb that is the other engagement member. In this embodiment, the frictional engagement device CL is configured by a wet-type multi-plate clutch that operates by hydraulic pressure. In addition, in this embodiment, the frictional engagement device CL is provided in such a manner that the frictional engagement device CL can release the connection in a driving manner between the input member I and the rotational element (in this example, the second rotational element e2) of the differential gear unit DG. That is, in this embodiment, the frictional engagement device CL is provided in a power transmission path between the input member I and the rotational element (in this example, the second rotational element e2) of the differential gear unit DG.

In addition, the first engagement member CLa serves as an input side engagement member that is connected in a driving manner to the input member I to rotate integrally therewith, and the second engagement member CLb serves as an output side engagement member that is connected in a driving manner to the second rotational element connecting member 42 so as to rotate integrally therewith.

In addition, as shown in FIG. 1, in this embodiment, the first rotating electrical machine MG1 is connected in a driving manner to the sun gear s (the first rotational element e1), the input member I is connected in a driving manner to the carrier ca (the second rotational element e2), and the second rotating electrical machine MG2 and the output member O are connected in a driving manner to the ring gear r (the third rotational element e3), not through another rotational element of the planetary gear mechanism PG (differential gear unit DG). That is, in this embodiment, the second rotating electrical machine MG2 is connected in a driving manner to the ring gear r (the third rotational element e3) that is the rotational element, to which the output member O is connected in a driving manner, of the differential gear unit DG, not through another rotational element of the differential gear unit DG.

Specifically, the first rotor shaft to which the first rotor Ro1 is fixed is connected in a driving manner to the first rotational element connecting member 41 to rotate integrally therewith, such that first rotating electrical machine MG1 is connected in a driving manner to the sun gear s. That is, in this embodiment, the rotation speed of the sun gear s (the first rotational element e1) is always equal to that of the first rotor Ro1 (the first rotating electrical machine MG1).

The input member I is connected in a driving manner with respect to the first engagement member CLa of the frictional engagement device CL to rotate integrally therewith, and thereby is selectively connected in a driving manner to the carrier ca through the frictional engagement device CL. Here, "selectively connected in a driving manner" represents that a state of transmitting a driving power between two rotational elements that are connected in a driving manner is selectively realized, That is, in this embodiment, in a case where the frictional engagement device CL is in a direct engagement state, the rotation speed of the carrier ca (the second rotational element e2) becomes equal to that of the input member I (the internal combustion engine E). In addition, in this embodiment, a difference in the rotation speed between the two engagement members of the frictional engagement device CL becomes a difference between the rotation speed of the input member I (the internal combustion engine E) and the rotation speed of the carrier ca (the second rotational element connecting member 42).

The second rotating electrical machine MG2 and the output member O are connected in a driving manner to the ring gear r through a counter gear mechanism C. As shown in FIG. 1, the counter gear mechanism C includes a first counter gear 53, a second counter gear 54, and a counter shaft that connects these counter gears in order for these counter gears to rotate integrally with each other. The third rotational element connecting member 43 includes a counter drive gear 52 that engages with the first counter gear 53. In addition, the second rotating electrical machine output gear 55 is disposed to engage with the first counter gear 53 at a position in which a peripheral direction (a peripheral direction of the first counter gear 53) is different from that of the counter drive gear 52, such that the second rotating electrical machine MG2 is connected in a driving manner to the ring gear r. In addition, the output member O is disposed to engage with the second counter gear 54, and thereby is connected in a driving manner to the ring gear r. That is, in this embodiment, the rotation speeds of the ring gear r, the second rotating electrical machine MG2, and the output member O are proportional to each other, and a proportionality coefficient (that is, a ratio of rotation speeds) thereof becomes a value corresponding to dimensions of a gear interposed therebetween.

When including the above-described configurations, the driving device 1 for a vehicle is provided with a hybrid traveling mode (split traveling mode) in which traveling is performed with both output torque of the internal combustion engine E and output torque of the rotating electrical machines MG1 and MG2, and an electric traveling mode (EV traveling mode) in which traveling is performed by only the output torque of the rotating electrical machines MG1 and MG2 (in this example, by only the second rotating electrical machine MG2). In the hybrid traveling mode, the frictional engagement device CL becomes a direct engagement state, and the output torque of the internal combustion engine E is distributed to the sun gear s (the first rotating electrical machine MG1) and the ring gear r (the counter drive gear 52) by the planetary gear mechanism PG. In the EV traveling mode, the frictional engagement device CL enters a released state, and the internal combustion engine E becomes a stopped state. In addition, the rotation speed of the output shaft (the input member I) of the internal combustion engine basically becomes zero by a frictional force inside the internal combustion engine E, and the rotation speed of the first rotating electrical machine MG1 is controlled to be basically zero.

1-2. System Configuration of Driving Device for Vehicle 1-2-1. Overall Configuration of System A system configuration of the driving device 1 for a vehicle will be described. As shown in FIG. 2, the control device 70 according to this embodiment includes a traveling mode determining unit 79, a rotating electrical machine control unit 78, a differential rotation reducing control unit 71, an engagement control unit 73, and a starting up control unit 77.

In addition, the control device 70 includes an arithmetic operation processing unit such as a CPU as a basic configuration, a memory device such as a RAM and a ROM, or the like. In addition, respective functional units of the control device 70 are configured by software (program) stored in the ROM or the like or hardware such as an arithmetic operation circuit that is separately provided, or both software and hardware. The respective functional units described above are configured so as to transmit and receive information to and from each other.

The control device 70 is configured to acquire information from a sensor or the like provided at each portion of a vehicle so as to acquire information of each portion of the vehicle in which the driving device 1 for a vehicle is mounted. Specifically, as shown in FIG. 2, the control device 70 is configured to acquire information from an input member sensor Se1, an output member sensor Se3, an accelerator opening degree sensor Se11, a first rotor shaft sensor Se2, a sensor Se4 for a rotational element that is an object to be released, and an electricity storage state sensor Se10.

The input member sensor Se1 is a sensor that detects the rotation speed of the input member I. The rotation speed of the input member I, which is detected by the input member sensor Se1 is equal to the rotation speed of the internal combustion engine E in this example. The output member sensor Se3 is a sensor that detects the rotation speed of the output member O. The control device 70 derives a vehicle speed on the basis of the rotation speed of the output member O, which is detected by the output member sensor Se3. The accelerator opening degree sensor Se11 is a sensor that detects an accelerator opening degree by detecting an amount of operation of an accelerator pedal (not shown).

The first rotor shaft sensor Se2 is a sensor that detects the rotation speed of the first rotating electrical machine MG1 (the first rotor shaft), and in this example, the rotation speed of the first rotating electrical machine MG1, which is detected by the first rotor shaft sensor Se2, is equal to the rotation speed of the first rotational element connecting member 41 (the sun gear s). The first rotor shaft sensor Se2 may be, for example, a rotation sensor (resolver or the like) provided to the first rotating electrical machine MG1.

The sensor Se4 for a rotational element that is an object to be released is a sensor that detects the rotation speed of the rotational element en, which is an object to be released, among the rotational elements provided to the differential gear unit DG. Here, the rotational element en that is an object to be released is a rotational element in which the connection in a driving manner with any of the input member I, the output member O, and the first rotating electrical machine MG1 may be released by the frictional engagement device CL. In this embodiment, the carrier ca is the rotational element en that is an object to be released, and the sensor Se4 for a rotational element that is an object to be released detects the rotation speed of the second rotational element connecting member 42.

The electricity storage state sensor Se10 is a sensor that detects a state (in this example, a temperature and an amount of electricity storage) of the electricity storage device B. In this embodiment, the electricity storage state sensor Se10 includes a voltage sensor, a current sensor, or the like, and detects the amount of electricity storage by detecting an SOC (state of charge). In addition, the electricity storage state sensor Se10 includes a temperature sensor, and detects a temperature of the electricity storage device B.

As shown in FIG. 2, the vehicle is provided with an internal combustion engine control unit 3. The internal combustion engine control unit 3 performs an operation control of the internal combustion engine E by controlling each portion of the internal combustion engine E. Specifically, the internal combustion engine control unit 3 sets target torque and a target rotation speed as control targets of the output torque and the rotation speed of the internal combustion engine E, and performs an operation control of the internal combustion engine E by operating the internal combustion engine E in correspondence with the control targets. In addition, the target torque and the target rotation speed are set on the basis of an instruction from the control device 70. In addition, in a state in which the internal combustion engine E is stopped, when receiving a starting up instruction from the control device 70, the internal combustion engine control unit 3 starts fuel injection and ignition to change the internal combustion engine E into a started up state. In addition, in a started up state of the internal combustion engine E, when receiving a stop instruction from the control device 70, the internal combustion engine control unit 3 stops the fuel injection and the ignition to change the internal combustion engine E into a stopped state.

1-2-2. Configuration of Traveling Mode Determining Unit

The traveling mode determining unit 79 is a functional unit that determines a traveling mode of the vehicle. The traveling mode determining unit 79, for example, determines a traveling mode which the driving device 1 for a vehicle realizes based on a vehicle speed derived based on the detection result of the output member sensor Se3, the accelerator opening degree detected by the accelerator opening degree sensor Se11, and the electricity storage state (the amount of electricity storage, the temperature, or the like) detected by the electricity storage state sensor Se10. In this embodiment, the traveling mode, which may be determined by the traveling mode determining unit 79, includes the electric traveling mode and the hybrid traveling mode. In addition, basically, the traveling mode determining unit 79 determines the traveling mode with reference to a mode selection map (not shown) that defines a relationship between the traveling mode, and the vehicle speed, the accelerator opening degree, and the electricity storage state that are stored in the memory device 6 configured by a memory or the like.

According to this mode selection map, in a case where an internal combustion engine starting up condition is established during traveling in the electric traveling mode, it is determined to be transitioned to the hybrid traveling mode. Here, the internal combustion engine starting up condition is a condition to start up the internal combustion engine E in a stopped state, and is established in a case where a situation in which the vehicle needs the torque of the internal combustion engine E. For example, in a case where it becomes a state in which the torque, which is required for the vehicle, may not be obtained by only the rotating electrical machines MG1 and MG2, when a driver strongly pushes the accelerator pedal during traveling in the electric traveling mode or while the vehicle is stopped, or the like, the starting up condition of the internal combustion engine is established. In addition, the starting up condition of the internal combustion engine is also established in a case where the amount of electricity storage of the electricity storage device B decreases to a predetermined threshold value or less, such that it is necessary to start up the internal combustion engine E and to allow the rotating electrical machines MG1 and MG2 to generate electricity using the torque of the internal combustion engine E so as to charge the electricity storage device B.

1-2-3. Configuration of Rotating Electrical Machine Control Unit

The rotating electrical machine control unit 78 is a functional unit that performs an operation control of the first rotating electrical machine MG1 or the second rotating electrical machine MG2. Specifically, the rotating electrical machine control unit 78 sets target torque and a target rotation speed as control targets of the output torque and the rotation speed of the first rotating electrical machine MG1, and controls the first inverter 4 so that the first rotating electrical machine MG1 operates in correspondence with the control targets. In this example, the rotating electrical machine control unit 78 performs the operation control of the first rotating electrical machine MG1 by a torque control or a rotation speed control. Here, the torque control is a control in which target torque with respect to the first rotating electrical machine MG1 is set, and the output torque of the first rotating electrical machine MG1 is made to approach (follow) the target torque. In addition, the rotation speed control is a control in which a target rotation speed with respect to the first rotating electrical machine MG1 is set, and the output torque of the first rotating electrical machine MG1 is controlled to make the rotation speed of the first rotating electrical machine MG1 approach (follow) the target rotation speed. In addition, a control with respect to the second rotating electrical machine MG2 is the same as the first rotating electrical machine MG1 except that the first inverter 4 is transitioned to the second inverter 5.

Figure 3:
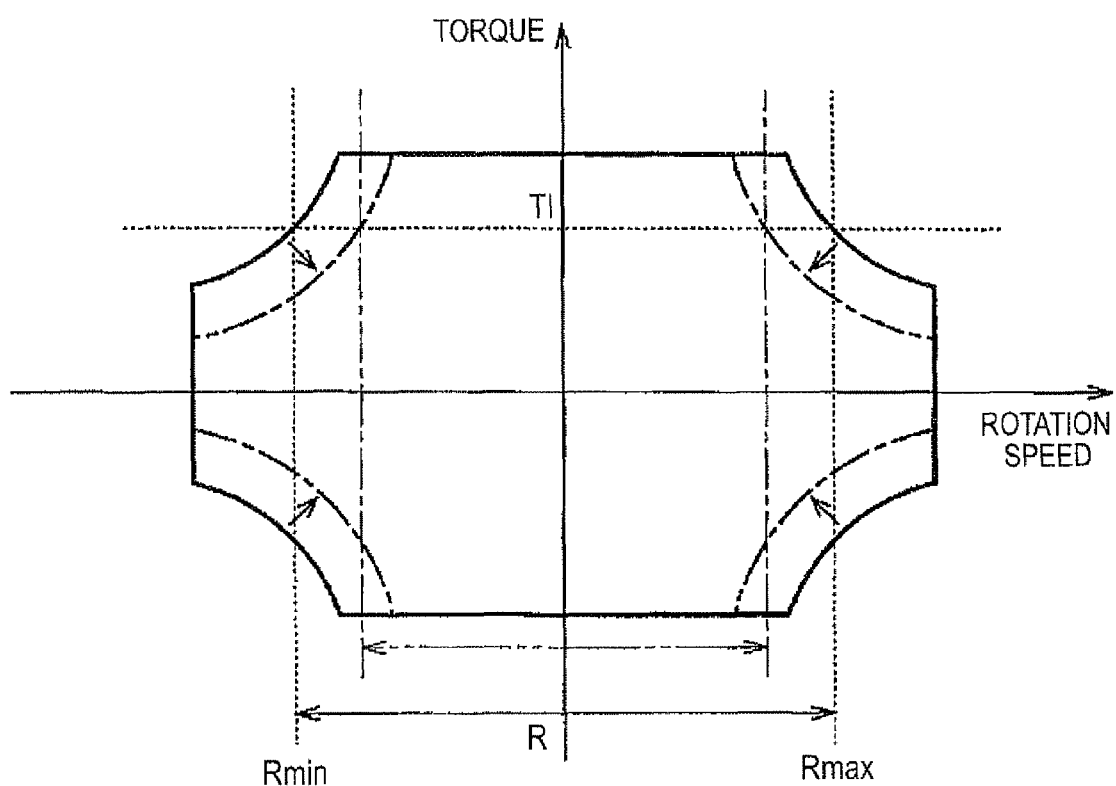
FIG. 3 is an explanatory diagram of a starting up torque outputable range according to the first embodiment of the invention.

In addition, the rotating electrical machine control unit 78 sets the target torque and the target rotation speed within a range of an operable region (region surrounded by a bold solid line) that is conceptually indicated in FIG. 3. As shown in FIG. 3, the magnitude (absolute value, the same hereinafter) of the maximum torque that may be generated by the rotating electrical machines MG1 and MG2 is set in such a manner that the magnitude of the maximum torque becomes substantially constant in a state in which the absolute value of the rotation speed is a predetermined value or less, and the magnitude of the maximum torque decreases as the absolute value of the rotation speed increases in a region exceeding the predetermined value. That is, the magnitude of the maximum torque that may be generated by the rotating electrical machines MG1 and MG2 is different in response to the rotation speed, and specifically, has a region that becomes small as the absolute value of the rotation speed becomes large.

In addition, in this embodiment, the magnitude of the maximum torque that may be generated by the rotating electrical machines MG1 and MG2 is set to vary in response to the state of the electricity storage device B. Specifically, the magnitude of the maximum torque, which may be generated by the rotating electrical machines MG1 and MG2, varies in response to the electric power that may be supplied from the electricity storage device B. Here, the electric power, which may be supplied from the electricity storage device B, is restricted in response to the temperature or the amount of electricity storage of the electricity storage device B. Therefore, in this embodiment, it is configured that the operable region is adjusted in response to the temperature or the amount of electricity storage of the electricity storage device B. Specifically, as the temperature of the electricity storage device B is away from the appropriate temperature to a lower side or a higher side, the magnitude of the maximum torque is set to be small. In addition, as the amount of electricity storage of the electricity storage device B is away from an appropriate amount of electricity storage to a lower side, the magnitude of the maximum torque is set to be small.

At this time, in this embodiment, as indicated by one dotted bold line in FIG. 3, it is configured that the magnitude of the maximum torque is set to be small by narrowing the operable region only in a region in which the absolute value of the rotation speed is large, in the vertical direction in the drawing. In addition, in this embodiment, the maximum value and the minimum value, which are permitted as the amount of charge of the electricity storage device B, are set in advance, and the magnitude of the maximum torque is set to decrease continuously or in a stepwise manner as the amount of charge of the electricity storage device B goes toward the minimum value from the maximum value. In addition, an appropriate temperature range that is an appropriate temperature range of the electricity storage device B is set in advance, and in a case where the temperature of the electricity storage device B is within the appropriate temperature range, the adjustment of the magnitude of the maximum torque based on the temperature of the electricity storage device B is not performed, and in a case where the temperature of the electricity storage device B is deviated from the appropriate temperature range toward a low temperature side or a high temperature side, the magnitude of the maximum torque is set to be small compared to the case where the temperature is within the appropriate temperature range.

In addition, it may be configured that the magnitude of the maximum torque is set to be small by narrowing the operable region in an entire region of the rotation speed region, which includes the region in which the absolute value of the rotation speed is small, in the vertical direction in the drawing without being limited to only in a region in which the absolute value of the rotation speed is large.

1-2-4. Configuration of Differential Rotation Reducing Control Unit

A differential rotation reducing control unit 71 is a functional unit that performs a differential rotation reducing control to change a rotation speed of the first rotating electrical machine MG1 in such a manner that the difference in the rotation speed between two engagement members, which engage with each other, in the frictional engagement device CL becomes small. The differential rotation reducing control unit 71 performs this differential rotation reducing control when the internal combustion engine E is started up from a state in which the frictional engagement device CL enters a released state, the internal combustion engine E is stopped, and the output member O rotates. That is, the differential rotation reducing control unit 71 performs the differential rotation reducing control in a case where it is determined to change the traveling mode from the electric traveling mode to the hybrid traveling mode by the traveling mode determining unit 79 during traveling of a vehicle.

In this embodiment, the input member I (the internal combustion engine E) is connected in a driving manner to the first engagement member CLa in two engagement members of the frictional engagement device CL, and the second rotational element connecting member 42 (the carrier ca) is connected in a driving manner to the second engagement member CLb. Therefore, in this embodiment, in the differential rotation reducing control, the differential rotation reducing control unit 71 changes the rotation speed of the first rotating electrical machine MG1 in such a manner that the difference in the rotation speed between the input member I and the second rotational element connecting member 42, that is, the difference in the rotation speed between the internal combustion engine E and the carrier ca becomes small.

Figure 4:
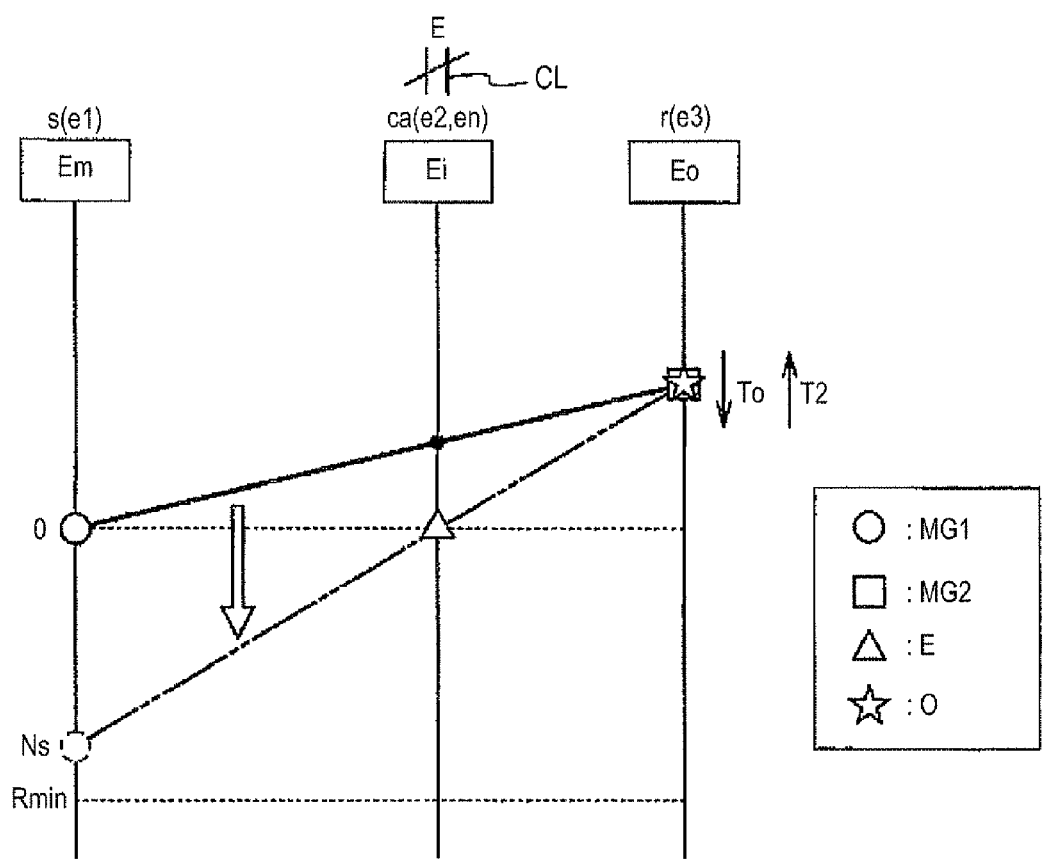
FIG. 4 is a speed diagram illustrating an operation of a differential rotation reducing control at a low speed according to the first embodiment of the invention.

The differential rotation reducing control that is performed in this embodiment will be described with reference to FIG. 4. FIG. 4 shows a speed diagram illustrating an operation state of the differential gear unit DG (in this example, the planetary gear mechanism PG). In this speed diagram, the vertical axis corresponds to a rotational speed of each rotational element. That is, "0" described in correspondence with the vertical axis represents that the rotation speed is zero, and an upper side represents a positive rotation (the rotation speed is positive) and a lower side represents a negative rotation (the rotation speed is negative). In addition, each of a plurality of vertical lines arranged in parallel with each other corresponds to each rotational element of the differential gear unit DG. In addition, "Em", "Ei", and "Eo", which are surrounded by a quadrilateral and are described at the upper sides of the respective vertical lines, represent a reaction force transmitting element Em, an input rotation element Ei, and an output rotation element Eo at the time of executing the hybrid traveling mode, respectively.

In addition, on the speed diagram, the rotation speed of the first rotating electrical machine MG1, the rotation speed of the second rotating electrical machine MG2, the rotation speed of the internal combustion engine E (the input member I), and the rotation speed of the output member O are represented by symbols different from each other, respectively. In addition, for the easy understanding of the invention, the rotation speed of each member of the first rotating electrical machine MG1, the second rotating electrical machine MG2, the internal combustion engine E, and the output member O represents a rotation speed after converting the rotation speed (gear changing) by a power transmission member (excluding an engagement element that selectively transmits rotation and torque like the frictional engagement device CL) that is provided at a power transmission path to the rotational element (rotational element connecting member) of the differential gear unit DG.

Specifically, in this embodiment, since the first rotating electrical machine MG1 is connected in a driving manner to the first rotational element connecting member 41 to rotate integrally therewith, the rotation speed of the first rotating electrical machine MG1 (the sun gear s) in the speed diagram is equal to a real rotation speed of the first rotating electrical machine MG1. In addition, when being in a direct engagement state with respect to the frictional engagement device CL, the internal combustion engine E (the input member I) rotates at the same rotation speed as the second rotational element connecting member 42, such that the rotation speed of the internal combustion engine E (the carrier ca) in the speed diagram is equal to a real rotation speed of the internal combustion engine E.

On the other hand, since the second rotating electrical machine MG2 is connected in a driving manner to the third rotational element connecting member 43 through the counter gear mechanism C, the rotation speed of the second rotating electrical machine MG2 (the ring gear r) on the speed diagram becomes a value obtained by multiplying the real rotation speed of the second rotating electrical machine MG2 and a gear ratio of a power transmission system including the second rotating electrical machine output gear 55, the first counter gear 53, and the counter drive gear 52. Similarly, since the output member O is connected in a driving manner to the third rotational element connecting member 43 through the counter gear mechanism C, the rotation speed of the output member O on the speed diagram becomes a value obtained by multiplying the real rotation speed of the output member O and the gear ratio of the power transmission system including the differential input gear (the output member O), the second counter gear 54, the first counter gear 53, and the counter drive gear 52.

In addition, "T1" represents torque (first rotating electrical machine torque) that is transmitted from the first rotating electrical machine MG1 to the rotational element (in this example, the sun gear s) of the differential gear unit DG, "T2" represents torque (second rotating electrical machine torque) that is transmitted from the second rotating electrical machine MG2 to the rotational element (in this example, the ring gear r) of the differential gear unit DG, and "To" represents torque (traveling torque, traveling resistance) that is transmitted from the output member O (wheels W) to the rotational element (in this example, the ring gear r) of the differential gear unit DG. In an arrow disposed near each torque, an upward arrow represents positive direction torque, and a downward arrow represents negative direction torque. In addition, in each speed diagram that is referred to in the following description, the operational state of the differential gear unit DG is illustrated similarly to FIG. 4.

In FIG. 4, a solid line represents an operational state in the electric traveling mode in which the frictional engagement device CL enters a released state, and the traveling is performed using only the output torque of the rotating electrical machines MG1 and MG2 (in this example, by only the second rotating electrical machine MG2). In this electric traveling mode, the second rotating electrical machine MG2 is controlled to output torque T2 of the second rotating electric machine in response to vehicle request torque (torque required from a vehicle side) that is determined based on a vehicle speed, an accelerator opening degree, or the like. FIG. 4 illustrates a case in which torque for accelerating or cruising a vehicle is required, and the second rotating electrical machine MG2 is powering while rotating in the positive direction against the traveling torque To that operates on the ring gear r in the negative direction to output the second rotating electrical machine torque T2 in the positive direction.

In the electric traveling mode, the frictional engagement device CL enters a released state, and the rotational element en, which is an object to be released, of the differential gear unit DG becomes a freely rotating state. In this embodiment, the rotational element en that is an object to be released is the carrier ca, and the frictional engagement device CL is provided at the power transmission path between the carrier ca and the internal combustion engine E. Therefore, in the electric traveling mode, the carrier ca and the internal combustion engine E becomes a non-contact state (non-connection state), such that the internal combustion engine E is detached from the carrier ca and therefore the carrier ca becomes a freely rotating state. In this embodiment, as indicated by the solid line in FIG. 4, in the electric traveling mode, the rotation speed of the first rotating electrical machine MG1 becomes basically zero, and the carrier ca rotates at a rotation speed that is determined based on the rotation speed of the ring gear r, which is determined in response to the vehicle speed, and the rotation speed of the sun gear s, which is determined in response to the rotation speed of the first rotating electrical machine MG1.

In addition, when the internal combustion engine E is attempted to be started up from the state indicated by the solid line in FIG. 4, the differential rotation reducing control is performed, and therefore the rotational speed of the first rotating electrical machine MG1 is made to vary in such a manner that the difference in the rotation speed between the internal combustion engine E and the carrier ca decreases. In this embodiment, the first rotating electrical machine MG1 outputs torque of the negative direction and decreases the rotation speed thereof so as to gradually decrease the rotation speed of the carrier ca. In addition, "decrease" with respect to the rotation speed represents that the rotation speed is made to vary in the negative direction, and "increase" with respect to the rotation speed represents that the rotation speed is made to vary in the positive direction.

A two-dotted line in FIG. 4 represents a state in which the differential rotation reducing control is performed, and thereby the rotation speed of the carrier ca becomes equal to the rotation speed (in the example, zero) of the internal combustion engine E. In addition, the differential rotation reducing control may have a configuration that is performed through a rotation speed control by the rotating electrical machine control unit 78. Here, in the rotation speed control, for example, a rotation speed feedback control is performed based on a difference between the target rotation speed of the first rotating electrical machine MG1 and the real rotation speed of the first rotating electrical machine MG1, which is detected by the first rotor shaft sensor Se2.

However, as shown in FIG. 3, the magnitude of the maximum torque that may be generated by the rotating electrical machines MG1 and MG2 has a region in which the magnitude becomes small as the absolute value of the rotation speed becomes large. In addition, as described later, after performing the differential rotation reducing control, the frictional engagement device CL becomes a direct engagement state (a state indicated by the solid line in FIG. 5) by the engagement control unit 73, and then a starting up control to change the rotation speed of the first rotating electrical machine MG1 is performed by the starting up control unit 77, in which the rotation speed (starting up rotation speed Ni described later) of the first rotating electrical machine MG1, which allows the internal combustion engine E to have a rotation speed (an ignition rotation speed Nf described later) at which the starting up is possible, is made as a target value. At the time of performing the starting up control, since the rotation speed of the internal combustion engine E is changed by the output torque of the first rotating electrical machine MG1, the rotation speed of the first rotating electrical machine MG1 at the time of initiating the performing of the starting up control is necessary to be a rotation speed capable of outputting the starting up torque TI necessary for the starting up of the internal combustion engine E. In addition, the starting up torque TI is set in response to a gear ratio of the differential gear unit DG, a target change ratio of the rotation speed of the internal combustion engine E at the time of cranking the internal combustion engine E, or the like.

As conceptually illustrated in FIG. 3, a starting up torque outputable range R, which is a range of the rotation speed at which the first rotating electrical machine MG1 may output the starting up torque TI, becomes a range having the upper limit Rmax and the lower limit Rmin. Therefore, the differential rotation reducing control unit 71 is configured to change the rotation speed of the first rotating electrical machine MG1 with the upper limit Rmax and the lower limit Rmin of the starting up torque outputable range R made as limits. Therefore, it is possible to make the difference in the rotation speed between the two engagement members of the frictional engagement device CL small within a range in which the internal combustion engine E may be appropriately started up. In addition, in this embodiment, each of the upper limit Rmax and the lower limit Rmin of the starting up torque outputable range R is set to a rotation speed at which the maximum value of the torque that may be output by the first rotating electrical machine MG1 becomes equal to the starting up torque TI. In addition, the upper limit Rmax of the starting up torque outputable range R may be set to a rotation speed that is lower by a predetermined value with respect to the rotation speed at which the maximum value of the torque that may be output by the first rotating electrical machine MG1 becomes equal to the starting up torque T1, and the lower limit Rmin of the starting up torque outputable range R may be set to a rotation speed that is higher by a predetermined rotation speed with respect to the rotation speed at which the maximum value of the torque that may be output by the first rotating electrical machine MG1 becomes equal to the starting up torque TI.

Specifically, in this embodiment, the differential rotation reducing control unit 71 includes a target rotation speed setting unit 72, and the differential rotation reducing control unit 71 changes the rotation speed of the first rotating electrical machine MG1 with the target rotation speed set by the target rotation speed setting unit 72 made as a target value. In this embodiment, the target rotation speed setting unit 72 determines whether or not the rotation speed (hereinafter, refer to as "synchronized rotation speed Ns") of the first rotating electrical machine MG1, which allows the two engagement members (in this example, the internal combustion engine E and the carrier ca) of the frictional engagement device CL to be a synchronization state, is within the starting up torque outputable range R.

Here, the synchronization state is a state in which the difference in the rotation speed between the two rotational members that are targets (here, two engagement members of the frictional engagement device CL) is less than the differential rotation threshold value. This synchronization state includes a state in which the rotation speed of one or both rotational members is zero. On the other hand, the state in which the difference in the rotation speed between the two rotational members that are targets is equal to or greater than the differential rotation threshold value is a non-synchronization state. This differential rotation threshold value is a predetermined threshold value that is set in advance, and for example, may be set to 10 rpm to 100 rpm. In addition, as shown in FIG. 2, information of the starting up torque outputable range R is memorized in the memory device 6 as outputable range data 6a, and the target rotation speed setting unit 72 performs the above-described determination with reference to the outputable range data 6a that is memorized in the memory device 6.

In addition, like a state shown in FIG. 4, in a case where the synchronization rotation speed Ns of the first rotating electrical machine MG1 is within the starting up torque outputable range R, the target rotation speed setting unit 72 sets the synchronization rotation speed Ns as the target rotation speed of the first rotating electrical machine MG1 in the differential rotation reducing control. In addition, the differential rotation reducing control unit 71 changes the rotation speed of the first rotating electrical machine MG1 so as to make the two engagement members become the synchronization state. This differential rotation reducing control is performed in a region at which the vehicle speed is low, such that hereinafter, the differential rotation reducing control in a case where the synchronization rotation speed Ns of the first rotating electrical machine MG1 is within the starting up torque outputable range R is referred to as "differential rotation reducing control at a low speed". In FIG. 4, a state in which the rotation speed of the first rotating electrical machine MG1 reaches the synchronization rotation speed Ns by performing the differential rotation reducing control at a low speed is indicated by the two-dotted line.

Figure 6:
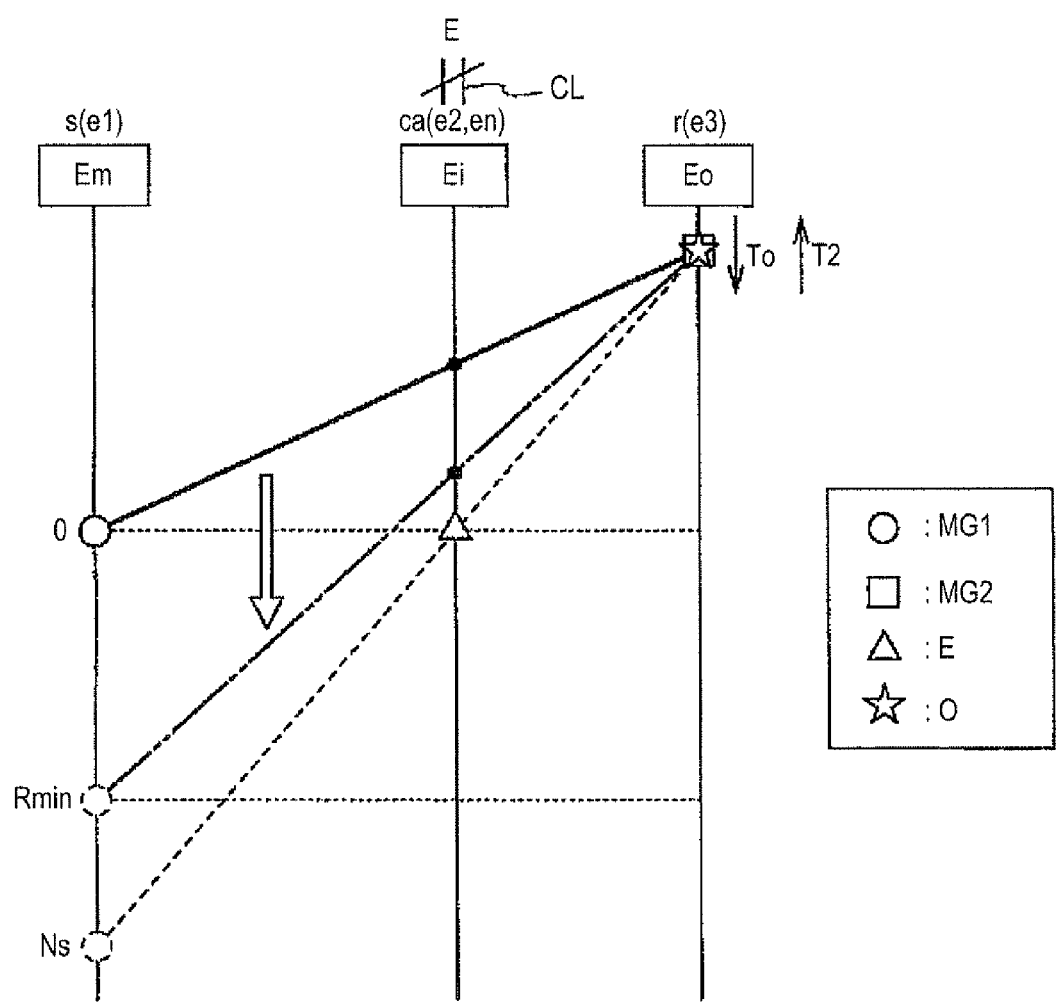
FIG. 6 is a speed diagram illustrating an operation of a differential rotation reducing control at a high speed according to the first embodiment of the invention.

On the other hand, similarly to a state shown in FIG. 6, in a case where the synchronization rotation speed Ns of the first rotating electrical machine MG1 is beyond the upper limit Rmax or the lower limit Rmin of the starting up torque outputable range R, the target rotation speed setting unit 72 sets either the upper limit Rmax or the lower limit Rmin as the target rotation speed in the differential rotation reducing control. Specifically, in the upper limit Rmax or the lower limit Rmin, a value (in this example, the lower limit Rmin) at which the difference in the rotation speed between the two engagement members becomes small is selected. In addition, the differential rotation reducing control unit 71 changes the rotation speed of the first rotating electrical machine MG1 with the target rotation speed (either the upper limit Rmax or the lower limit Rmin), which is set by the target rotation speed setting unit 72, made as a target value. This differential rotation reducing control is performed in a region at which the vehicle speed is high, such that hereinafter, the differential rotation reducing control in a case where the synchronization rotation speed Ns of the first rotating electrical machine MG1 is not within the starting up torque outputable range R is referred to as "differential rotation reducing control at a high speed". In FIG. 6, a state in which the rotation speed of the first rotating electrical machine MG1 reaches the lower limit Rmin of the starting up torque outputable range R by performing the differential rotation reducing control at a high speed is indicated by a two-dotted line.

However, as described above, the operable region (FIG. 3) of the first rotating electrical machine MG1 is set to be variable in response to a state of the electricity storage device B, and along with this, the starting up torque outputable range R is also set to be variable in response to the state of the electricity storage device B. Therefore, at the time of setting of the target rotation speed of the first rotating electrical machine MG1, the target rotation speed setting unit 72 acquires a current state (in this example, a temperature and an amount of electricity storage) of the electricity storage device B from the electricity storage state sensor Se10, and acquires information of the starting up torque outputable range R in response to the current state of the electricity storage device B. In addition, information (outputable range data 6a) of a plurality of starting up torque outputable ranges R corresponding to the states of the electricity storage device B, which are different from each other, may be memorized in the memory device 6 in advance, and the target rotation speed setting unit 72 may select and acquire the information of the starting up torque outputable range R corresponding to the current state of the electricity storage device B, or the target rotation speed setting unit 72 may derive and acquire the information of the starting up torque outputable range R corresponding to the current electricity storage state from the state of the electricity storage device B, which is acquired from the electricity storage state sensor Se10, and the information of the starting up torque outputable range R (the outputable range data 6*a* serving as a reference), which serves as a reference, based on a predetermined arithmetic operation equation.

1-2-5. Configuration of Engagement Control Unit

The engagement control unit 73 is a functional unit that controls an operation of the frictional engagement device CL. The engagement control unit 73 performs an operation control of the frictional engagement device CL by controlling a hydraulic pressure (a supply pressure to the frictional engagement device CL) that is supplied to the frictional engagement device CL through the hydraulic pressure control device 2. Specifically, the engagement control unit 73 generates a hydraulic pressure instruction value with respect to the frictional engagement device CL, and the hydraulic pressure control device 2 supplies a hydraulic pressure corresponding to the hydraulic pressure instruction value to the frictional engagement device CL.

Here, as an engagement state between the two engagement members of the frictional engagement device CL, "released state" in which rotation and torque are not transmitted between the two engagement members, "slip engagement state" in which the two engagement members engage with each other in a state where a difference in the rotation speed therebetween is present, and "direct engagement state" in which the two engagement members engage with each other in a state of integrally rotating, are present. That is, the "slip engagement state" is an engagement state in which torque is transmitted between the two engagement members in a state in which the two engagement members of the frictional engagement device CL rotate relatively to each other. In addition, the "direct engagement state" is an engagement state in which the two engagement members of the frictional engagement device CL are connected directly to each other and therefore the differential rotation is not present between the two engagement members.

A magnitude of torque, which may be transmitted between the two engagement members of the frictional engagement device CL, is determined in response to an engagement pressure of the frictional engagement device CL at that point of time. The magnitude of the torque at this time is set as a transmission torque capacity of the frictional engagement device CL. In this embodiment, an amount of oil supply and a magnitude of a supply pressure to the frictional engagement device CL are controlled in succession by a proportional solenoid valve in response to the hydraulic pressure instruction value with respect to the frictional engagement device CL, and therefore an increase and a decrease of the transmission torque capacity of the frictional engagement device CL may be controlled in succession.

In addition, the engagement control unit 73 performs an operation control of the frictional engagement device CL by a torque control or a rotation speed control. Here, the torque control is a control in which a target transmission torque capacity is set with respect to the frictional engagement device CL, and the hydraulic pressure instruction value is generated so that the transmission torque capacity of the frictional engagement device CL approaches (follows) the target transmission torque capacity. In addition, the rotation speed control is a control in which a target differential rotation speed is set with respect to the frictional engagement device CL, and the hydraulic pressure instruction value is generated so that the difference in the rotation speed between the two engagement members approaches (follows) the target differential rotation speed.

In this embodiment, the engagement control unit 73 includes a synchronization engagement control unit 74 and a non-synchronization engagement control unit 75. In addition, the engagement control unit 73 performs the engagement control of the frictional engagement device CL by the synchronization engagement control unit 74 or the non-synchronization engagement control unit 75 on condition that the differential rotation reducing control is performed by the differential rotation reducing control unit 71, and changes the frictional engagement device CL that is in the released state into the direct engagement state.

Figure 5:
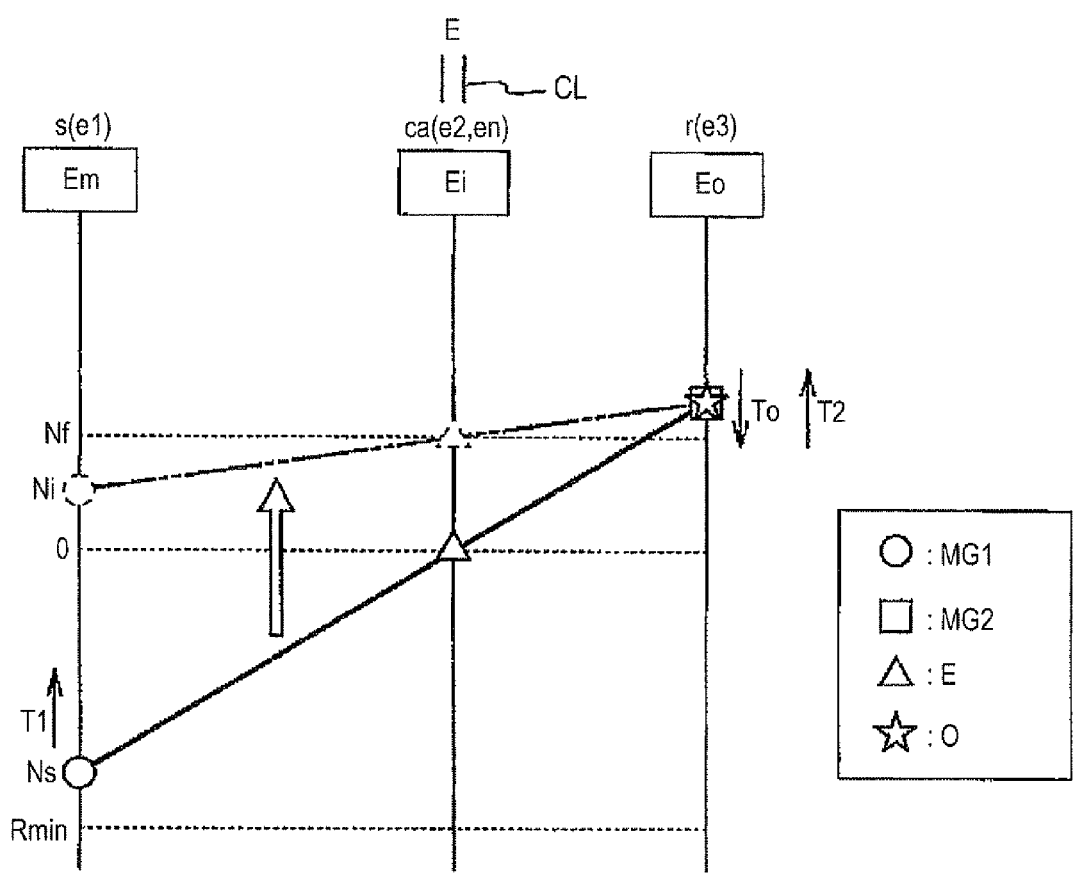
FIG. 5 is a speed diagram illustrating operations of a synchronization engagement control and a starting up control according to the first embodiment of the invention.

The synchronization engagement control unit 74 is a functional unit that performs a synchronization engagement control to allow the frictional engagement device CL to engage in a synchronization state in which the difference in the rotation speed between the two engagement members of the frictional engagement device CL is less than the threshold value of the differential rotation. In this embodiment, in a state in which the differential rotation reducing control at a low speed is performed by the differential rotation reducing control unit 71 and the rotation speed of the first rotating electrical machine MG1 reaches the synchronization rotation speed Ns that is a target value, the synchronization engagement control unit 74 initiates the engagement of the frictional engagement device CL to allow the frictional engagement device CL to be the direct engagement state. In addition, "reaching" of the target rotation speed, which is a target value, by the rotation speed of the first rotating electrical machine MG1 means a state in which the difference in the rotation speed between the rotation speed of the first rotating electrical machine MG1 and the rotation speed of the target rotation speed is less than a threshold value of a target-reaching determination. Here, the threshold value of the target-reaching determination may be set to, for example, 10 to 100 rpm. In FIG. 5, a state in which the frictional engagement device CL becomes the direct engagement state is indicated by the solid line.

In this embodiment, the synchronization engagement control unit 74 controls the hydraulic pressure instruction value with respect to the frictional engagement device CL so that the transmission torque capacity of the frictional engagement device CL increases with a predetermined change ratio (for example, a constant change ratio) from zero to a value (hereinafter, referred to as "normal direct engagement value") at which a normal direct engagement state is realized so as to change the frictional engagement device CL from the released state to the direct engagement state. In addition, in the synchronization engagement control, since the two engagement members that become objects to engage with each other are in the synchronization state, the change ratio becomes a relatively large value, and the transmission torque capacity of the frictional engagement device CL is increased to the normal direct engagement value within a relatively short time. That is, when the hydraulic pressure, which makes the transmission torque capacity of the frictional engagement device CL have the normal direct engagement value, is set as the "normal hydraulic pressure", the hydraulic pressure instruction value with respect to the frictional engagement device CL is increased to the normal hydraulic pressure within a relatively short time. Here, the "normal direct engagement state" means a state in which the direct engagement state is maintained regardless of a variation in the torque that is transmitted by the frictional engagement device CL. The normal hydraulic pressure to obtain this normal direct engagement state becomes, for example, a line pressure generated by the hydraulic pressure control device 2.

Figure 7:
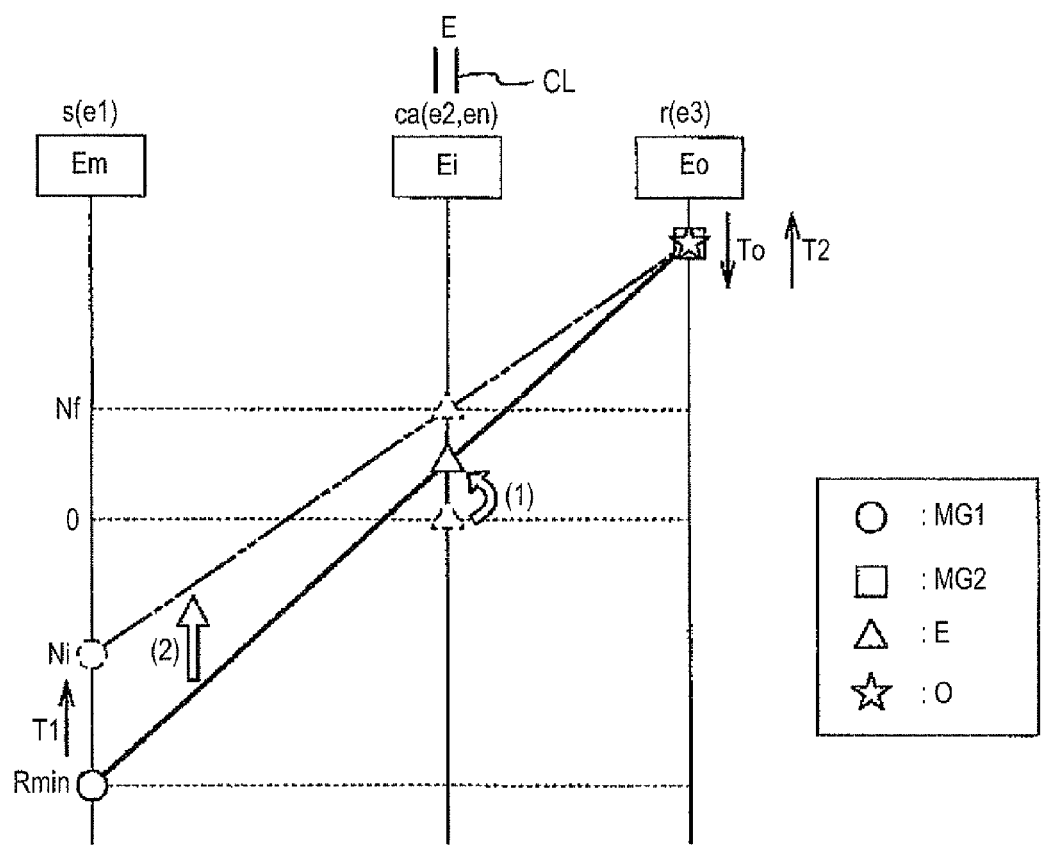
FIG. 7 is a speed diagram illustrating operations of a non-synchronization engagement control and a starting up control according to the first embodiment of the invention.

The non-synchronization engagement control unit 75 is a functional unit that performs the non-synchronization engagement control that allows the frictional engagement device CL to engage in the non-synchronization state in which the difference in the rotation speed between the two engagement members of the frictional engagement device CL is equal to or greater than the threshold value of the differential rotation. In this embodiment, in a state in which the differential rotation reducing control at a high speed is performed by the differential rotation reducing control unit 71, and the rotation speed of the first rotating electrical machine MG1 reaches one (in this example, the lower limit Rmin) of the upper limit Rmax and the lower limit Rmin of the starting up torque outputable range R, which is the target value, the non-synchronization engagement control unit 75 initiates the engagement of the frictional engagement device CL and allows the frictional engagement device CL to be the direct engagement state. In FIG. 7, a solid line indicates a state in which the rotation speed of the internal combustion engine E is increased to the rotation speed of the carrier ca by the non-synchronization engagement control (process indicated by an arrow (1) in FIG. 7), and the frictional engagement device CL becomes the direct engagement state.

In this embodiment, the non-synchronization engagement control unit 75 decreases the difference in the rotation speed between the two engagement members of the frictional engagement device CL in the slip engagement state, and performs a control to realize the direct engagement state, on condition of being in the synchronization state in which the difference in the rotational speed between the two engagement members is less than the threshold value of the differential rotation. At this time, non-synchronization engagement control unit 75 controls the hydraulic pressure instruction value with respect to the frictional engagement device CL so that the transmission torque capacity of the frictional engagement device CL increases with a predetermined change ratio (for example, a constant change ratio) from zero so as to change the frictional engagement device CL from the released state to the slip engagement state. In addition, in this non-synchronization engagement control, the two engagement members that become objects to engage with each other are in the non-synchronization state, the change ratio of the transmission torque capacity becomes a small value compared to the synchronization engagement control. That is, in the non-synchronization engagement control, the transmission torque capacity of the frictional engagement device CL is increased over a long time compared to the synchronization engagement control. In addition, when it is found that the difference in the rotation speed between two engagement members varies, the hydraulic pressure instruction value with respect to the frictional engagement device CL is controlled so that the transmission torque capacity of the frictional engagement device CL is maintained to a value at that point of time. Therefore, the frictional engagement device CL is maintained in the slip engagement state.

In addition, when it becomes the synchronization state in which the difference in the rotation speed between the two engagement members is less than the threshold value of the differential rotation due to the transmission of the torque in the slip engagement state, the non-synchronization engagement control unit 75 controls the hydraulic pressure instruction value with respect to the frictional engagement device CL so as to change the engagement state of the frictional engagement device CL from the slip engagement state to the direct engagement state. In this embodiment, even after the two engagement members of the frictional engagement device CL become the synchronization state, the non-synchronization engagement control unit 75 maintains the transmission torque capacity in the slip engagement state to allow the frictional engagement device CL to be in the direct engagement state.

In addition, after the frictional engagement device CL becomes the direct engagement state, the non-synchronization engagement control unit 75 controls the hydraulic pressure instruction value with respect to the frictional engagement device CL so that the hydraulic pressure increases to the normal hydraulic pressure with a predetermined change ratio (for example, a constant change ratio). Therefore, the transmission torque capacity of the frictional engagement device CL is increased to the normal direct engagement value with a predetermined change ratio (for example, a constant change ratio). In this embodiment, the control to allow the frictional engagement device CL to be the normal direct engagement state (the control to increase the hydraulic pressure instruction value to the normal hydraulic pressure) is performed concurrently with a starting up control by a starting up control unit 77 described later.

In addition, until the frictional engagement device CL becomes the direct engagement state by the performing of the non-synchronization engagement control, the rotating electrical machine control unit 78 performs a rotation speed control (in this example, a rotation speed feedback control) so that the rotation speed of the first rotating electrical machine MG1 is maintained to a rotation speed (in this example, the lower limit Rmin of the starting up torque outputable range R) after being changed by the differential rotation reducing control. At this time, in this embodiment, the first rotating electrical machine MG1 maintains the rotation speed thereof to the rotation speed (the lower limit Rmin) after being changed by the differential rotation reducing control by outputting the positive direction torque. In addition, the rotating electrical machine control unit 78 performs a control to correct the output torque of the second rotating electrical machine MG2 so as to remove output torque of the first rotating electrical machine MG1, which is transmitted to the wheels W through the ring gear r when initiating the engagement of the frictional engagement device CL, or load torque caused by the internal combustion engine E.

1-2-6. Configuration of Starting Up Control Unit

The starting up control unit 77 is a functional unit performing a starting up control that changes the rotation speed of the first rotating electrical machine MG1 with a rotation speed (starting up rotation speed Ni) of the first rotating electrical machine MG1, which allows the internal combustion engine E to have a rotation speed (ignition rotation speed Nf) at which the starting up is possible, made as a target value. The starting up control unit 77 performs the starting up control, on condition that the frictional engagement device CL becomes the direct engagement state by the performing of the engagement control by the engagement control unit 73. Due to this starting up control, the rotation speed (in this example, the rotation speed of the carrier ca) of the internal combustion engine E gradually increases and reaches the ignition rotation speed Nf after the passage of a predetermined time. In a case where a damper is provided between the internal combustion engine E and the driving device 1 for a vehicle, a change ratio in the rotation speed of the internal combustion engine E at this time is set to a change ratio in such a manner that it is possible to quickly come out from a resonance region of the damper. In addition, the ignition rotation speed Nf may be set to, for example, a number of idle rotations of the internal combustion engine E.

In the starting up control, the rotation speed of the first rotating electrical machine MG1 varies in a direction that is opposite to a variation direction in the differential rotation reducing control. Specifically, according to this embodiment, in the differential rotation reducing control, the first rotating electrical machine MG1 outputs negative direction torque to decrease the rotation speed thereof, and in the starting up control, the first rotating electrical machine MG1 outputs positive direction torque to increase the rotation speed thereof. In addition, basically, torque (in this embodiment, the positive direction torque), which is necessary for the first rotating electrical machine MG1 to output at the time of the starting up control, is torque that corresponds to (for example, equals) the starting up torque TI. In this embodiment, the output torque of the first rotating electrical machine MG1 is controlled so that the rotation speed of the first rotating electrical machine MG1 increases with a constant change ratio.

The starting up control may be configured to be performed by the rotation speed control by the rotating electrical machine control unit 78, and for example, may be configured to be performed by a rotation speed feedback control. In addition, the rotating electrical machine control unit 78 performs a control to correct the output torque of the second rotating electrical machine MG2 so as to remove output torque of the first rotating electrical machine MG1, which is transmitted to the wheels W through the ring gear r when performing the starting up control, or load torque caused by the internal combustion engine E.

A two-dotted line in FIG. 5 represents a state in which the starting up control is performed from a state (state indicated by the solid line in FIG. 5) after performing the differential rotation reducing control at a low speed and the synchronization engagement control, and thereby the rotation speed of the first rotating electrical machine MG1 reaches the starting up rotation speed Ni. At this time, the rotation speed of the internal combustion engine E increases from zero to the ignition rotation speed Nf. In addition, the control device 70 gives an instruction of starting up the internal combustion engine E with respect to the internal combustion engine control unit 3, on condition that the rotation speed of the first rotating electrical machine MG1 reaches the starting up rotation speed Ni, that is, on condition that the rotation speed of the internal combustion engine E reaches the ignition rotation speed Nf, and thereby the internal combustion engine E is started up by the internal combustion engine control unit 3. Hereinafter, as shown in FIGS. 4 and 5, a control of starting up the internal combustion engine E through the performing of the differential rotation reducing control at a low speed, the synchronization engagement control, and the starting up control is referred to as "starting up control at a low speed".

A two-dotted line shown in FIG. 7 represents a state in which the starting up control (a process indicated by an arrow (2) in FIG. 7) is performed from a state (a state indicated by the solid line in FIG. 7) after performing the differential rotation reducing control at a high speed and the non-synchronization engagement control, and thereby the rotation speed of the first rotating electrical machine MG1 reaches the starting up rotation speed Ni. At this time, the rotation speed of the internal combustion engine E increases from the rotation speed at the point of time when the frictional engagement device CL becomes the direct engagement state by the performing of the non-synchronization engagement control to the ignition rotation speed Nf. In addition, the control device 70 gives an instruction of starting up the internal combustion engine E with respect to the internal combustion engine control unit 3, on condition that the rotation speed of the first rotating electrical machine MG1 reaches the starting up rotation speed Ni, that is, on condition that the rotation speed of the internal combustion engine E reaches the ignition rotation speed Nf, and the internal combustion engine E is started up by the internal combustion engine control unit 3. Hereinafter, as shown in FIGS. 6 and 7, a control of starting up the internal combustion engine E through the differential rotation reducing control at a high speed, the non-synchronization engagement control, and the starting up control is referred to as "starting up control at a high speed".

1-3. Details of Starting Up Control at Low Speed

Figure 8:
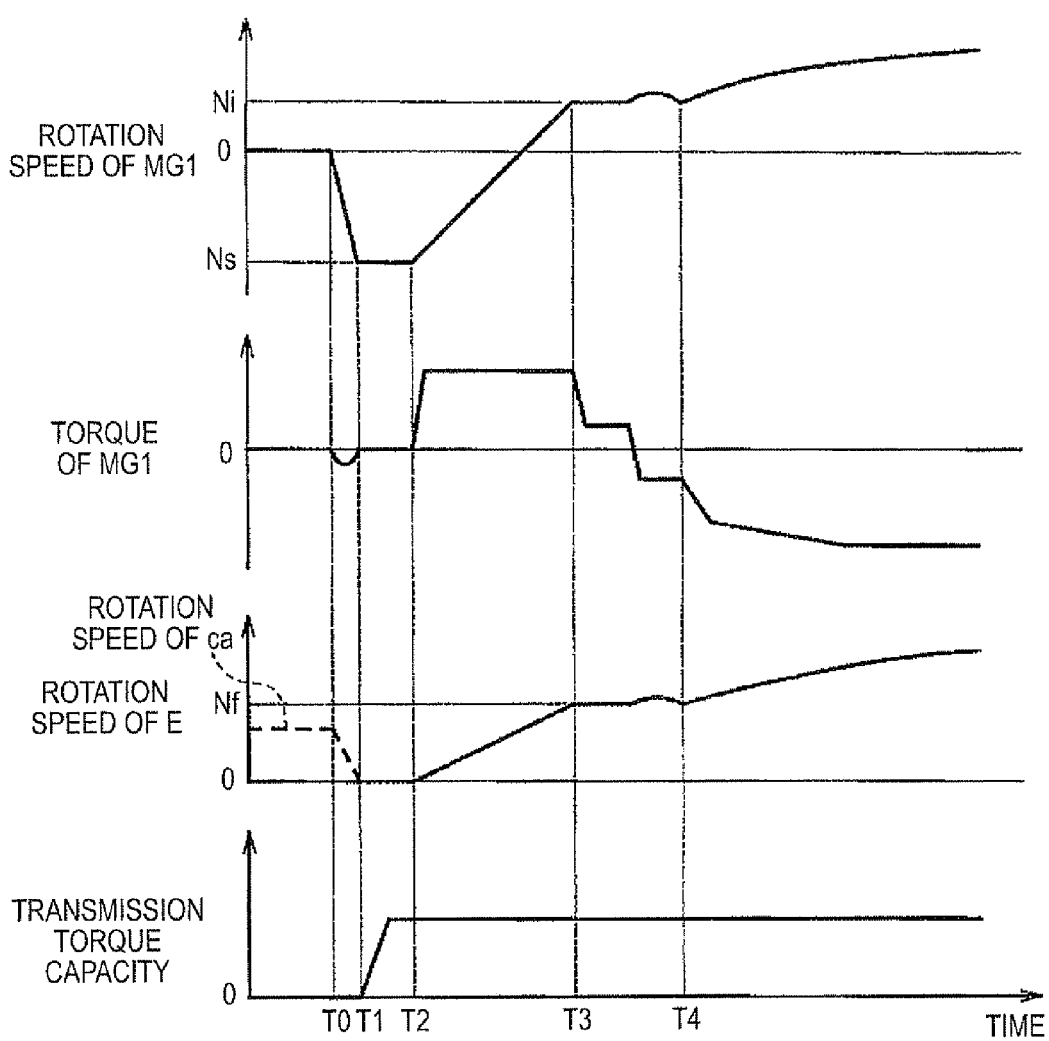
FIG. 8 is a time chart illustrating an example of an operation state of each portion at the time of performing a starting up control at a low speed according to the first embodiment of the invention.

Details of the starting up control at a low speed according to this embodiment will be described with reference to FIG. 8. FIG. 8 shows a diagram illustrating an example of a time chart at the time of starting up the internal combustion engine E by sequentially performing the differential rotation reducing control at a low speed, the synchronization engagement control, and the starting up control during traveling in the electric traveling mode. In addition, in FIG. 8, it is assumed that a request for the starting up of the internal combustion engine E is made at time T0 (a transition to a hybrid traveling mode is determined by the traveling mode determining unit 79), and the internal combustion engine E initiates a self-sustained operation at time T4.

The transmission torque capacity of the frictional engagement device CL becomes zero until it reaches time T0, and a vehicle travels by the output torque of the second rotating electrical machine MG2 in a state in which the internal combustion engine E is stopped. The rotation speed of the first rotating electrical machine MG1 becomes zero and the first rotating electrical machine MG1 becomes a state in which torque is not output. Therefore, the carrier ea becomes a state in which it rotates at a predetermined rotation speed (refer to the solid line in FIG. 4).

When a request for the starting up of the internal combustion engine E is made at time T0, the differential rotation reducing control unit 71 performs the differential rotation reducing control at a low speed. At this time, it is controlled in such a manner that the rotation speed of the first rotating electrical machine MG1 varies with the synchronization rotation speed Ns made as a target value. Specifically, the first rotating electrical machine MG1 is controlled by a rotation speed feedback control and outputs negative direction torque, and thereby the rotation speed thereof decreases. In addition, at time T1, the rotation speed of the first rotating electrical machine MG1 reaches the synchronization rotation speed Ns that is a target value (refer to the two-dotted line in FIG. 4).

At time T1, when the rotation speed of the first rotating electrical machine MG1 reaches the synchronization rotation speed Ns, and the two engagement members of the frictional engagement device CL become a synchronization state, the synchronization engagement control unit 74 initiates the engagement of the frictional engagement device CL to allow the frictional engagement device CL to be changed into the direct engagement state from the released state (refer to the solid line in FIG. 5). In this example, the synchronization engagement control unit 74 controls the hydraulic pressure instruction value with respect to the hydraulic pressure control device 2 so that the transmission torque capacity of the frictional engagement device CL increases with a constant change ratio from zero to the normal direct engagement value (transmission torque capacity corresponding to the normal hydraulic pressure). At this time, the rotation speed of the first rotating electrical machine MG1 is maintained to the synchronization rotation speed Ns.

In addition, after the frictional engagement device becomes a direct engagement state (in this example, a normal direct engagement state) (time T2), the starting up control unit 77 changes the rotation speed of the first rotating electrical machine MG1 with the starting up rotation speed Ni made as a target value. In this state, since the frictional engagement device CL is in the direct engagement state, the rotation speed of the internal combustion engine E also increases accompanied with the increase in the rotation speed of the first rotating electrical machine MG1. In this example, the rotation speed of the first rotating electrical machine MG1 is controlled by the rotation speed feedback control so that the rotation speed of the internal combustion engine E increases with a constant change ratio.

At time T3, when the rotation speed of the first rotating electrical machine MG1 reaches the starting up rotation speed Ni, the rotation speed of the internal combustion engine E reaches the ignition rotation speed Nf (refer to the two-dotted line in FIG. 5). In this state, the control device 70 gives an instruction of starting up the internal combustion engine E with respect to the internal combustion engine control unit 3, and therefore the internal combustion engine E is started up by the internal combustion engine control unit 3.

After the internal combustion engine E is started up, the output torque of the first rotating electrical machine MG1 is changed in a negative direction in response to the magnitude of positive direction torque output from the internal combustion engine E, and at time T4, after the internal combustion engine E initiates the self-sustained operation, the first rotating electrical machine MG1 is controlled to output a reaction force (negative direction torque) with respect to the torque of the internal combustion engine E.

1-4. Details of Starting Up Control at High Speed

Figure 9:
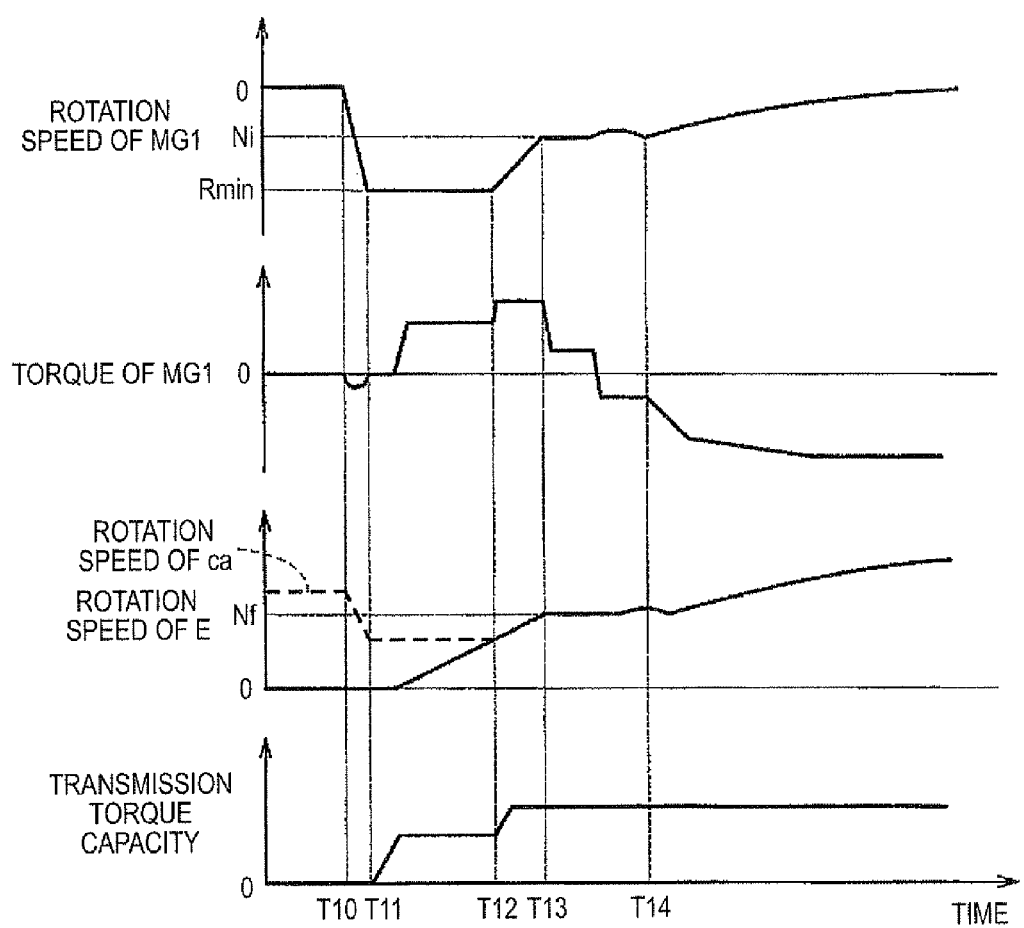
FIG. 9 is a time chart illustrating an example of an operation state of each portion at the time of performing a starting up control at a high speed according to the first embodiment of the invention.

Details of the starting up control at a high speed according to this embodiment will be described with reference to FIG. 9. FIG. 9 shows a diagram illustrating an example of a time chart at the time of starting up the internal combustion engine E by sequentially performing the differential rotation reducing control at a high speed, the non-synchronization engagement control, and the starting up control during traveling in the electric traveling mode. In addition, in FIG. 9, it is assumed that a request for the starting up of the internal combustion engine E is made at time T10 (a transition to a hybrid traveling mode is determined by the traveling mode determining unit 79), and the internal combustion engine E initiates a self-sustained operation at time T14.

The transmission torque capacity of the frictional engagement device CL becomes zero until it reaches time T10, and a vehicle travels by the output torque of the second rotating electrical machine MG2 in a state in which the internal combustion engine E is stopped. The rotation speed of the first rotating electrical machine MG1 becomes zero and the first rotating electrical machine MG1 becomes a state in which torque is not output. Therefore, the carrier ca becomes a state in which it rotates at a predetermined rotation speed (refer to a solid line in FIG. 6).

When a request for the starting up of the internal combustion engine E is made at time T10, the differential rotation reducing control unit 71 performs the differential rotation reducing control at a high speed. At this time, it is controlled in such a manner that the rotation speed of the first rotating electrical machine MG1 varies with the lower limit Rmin of the starting up torque outputable range R made as a target value. Specifically, the first rotating electrical machine MG1 is controlled by a rotation speed feedback control and outputs negative direction torque, and thereby the rotation speed thereof decreases. In addition, at time T11, the rotation speed of the first rotating electrical machine MG1 reaches the lower limit Rmin of the starting up torque outputable range R that is a target value (refer to the two-dotted line in FIG. 6).

At time T11, when the rotation speed of the first rotating electrical machine MG1 reaches the lower limit Rmin of the starting up torque outputable range R, the non-synchronization engagement control unit 75 initiates the engagement of the frictional engagement device CL to allow the frictional engagement device CL to be changed into the direct engagement state from the released state (refer to the solid line in FIG. 7). In this example, at time T11, the non-synchronization engagement control unit 75 controls the hydraulic pressure instruction value with respect to the frictional engagement device CL so that the transmission torque capacity of the frictional engagement device CL increases with a constant change ratio from zero. In addition, when a difference in the rotation speed of the internal combustion engine E, which is detected by the input member sensor Se1, is found, the hydraulic pressure instruction value with respect to the frictional engagement device CL is controlled so that the transmission torque capacity of the frictional engagement device CL is maintained to a value at that point of time. Therefore, the frictional engagement device CL is maintained in the slip engagement state.

In addition, until the frictional engagement device CL becomes the direct engagement state after time T11, the rotation speed of the first rotating electrical machine MG1 is maintained to the lower limit Rmin of the starting up torque outputable range R by the rotation speed feedback control. Therefore, after the frictional engagement device CL becomes the slip engagement state, the first rotating electrical machine MG1 is controlled to output positive direction torque. A difference in the rotation speed between the carrier ca and the internal combustion engine E becomes small along with the passage of time after the slip engagement state, and the rotation speeds of the carrier ca and the internal combustion engine E at time T12 become equal to each other, and therefore the frictional engagement device CL becomes the direct engagement state.

In addition, after the frictional engagement device becomes the direct engagement state (in this example, a direct engagement state in which an engagement pressure is lower than the normal direct engagement state) (time T12), the starting up control unit 77 changes the rotation speed of the first rotating electrical machine MG1 with the starting up rotation speed Ni made as a target value. In this state, since the frictional engagement device CL is in the direct engagement state, the rotation speed of the internal combustion engine E also increases accompanied with the increase in the rotation speed of the first rotating electrical machine MG1. In this example, the rotation speed of the first rotating electrical machine MG1 is controlled by the rotation speed feedback control so that the rotation speed of the internal combustion engine E increases with a constant change ratio.

In addition, in this example, at time T12, the performing of the starting up control is initiated, and the non-synchronization engagement control unit 75 initiates the performing of a control to allow the frictional engagement device CL to be changed into the normal direct engagement state. Specifically, the non-synchronization engagement control unit 75 control the hydraulic pressure instruction value with respect to the hydraulic pressure control device 2 so that the transmission torque capacity of the frictional engagement device CL increases with a constant change ratio to the normal direct engagement value (transmission torque capacity corresponding to the normal hydraulic pressure).

At time T13, when the rotation speed of the first rotating electrical machine MG1 reaches the starting up rotation speed Ni, the rotation speed of the internal combustion engine E reaches the ignition rotation speed Nf (refer to the two-dotted line in FIG. 7). In this state, the control device 70 gives an instruction of starting up the internal combustion engine E with respect to the internal combustion engine control unit 3, and therefore the internal combustion engine E is started up by the internal combustion engine control unit 3.

After the internal combustion engine E is started up, the output torque of the first rotating electrical machine MG1 is changed in a negative direction in response to the magnitude of positive direction torque output from the internal combustion engine E, and at time T14, after the internal combustion engine E initiates the self-sustained operation, the first rotating electrical machine MG1 is controlled to output a reaction force (negative direction torque) with respect to the torque of the internal combustion engine E.

1-5. Procedure of Starting Up Control of Internal Combustion Engine

Figure 10:
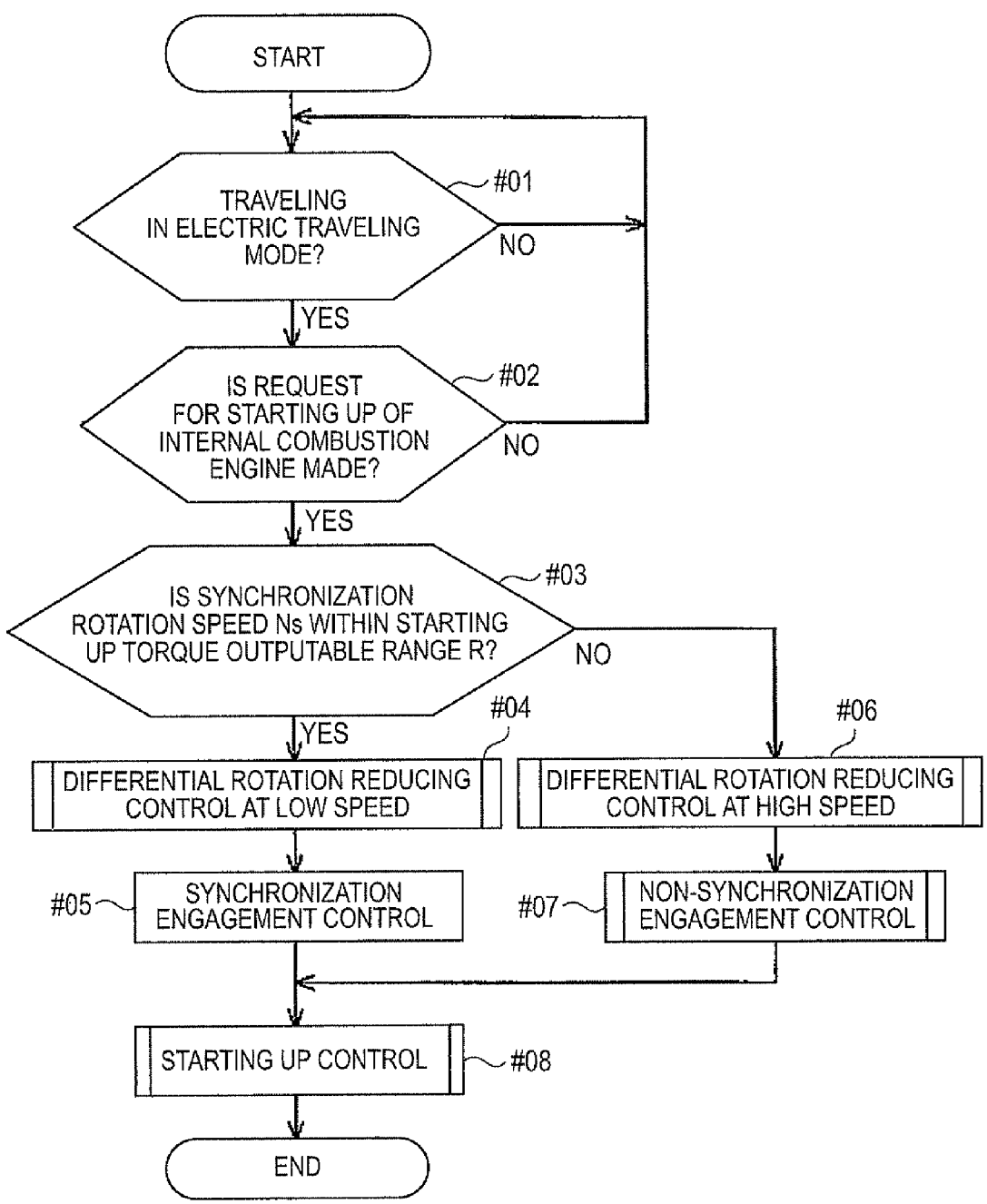
FIG. 10 is a flow chart illustrating the overall procedures of an internal combustion engine starting up control according to the first embodiment of the invention.
Figure 11:
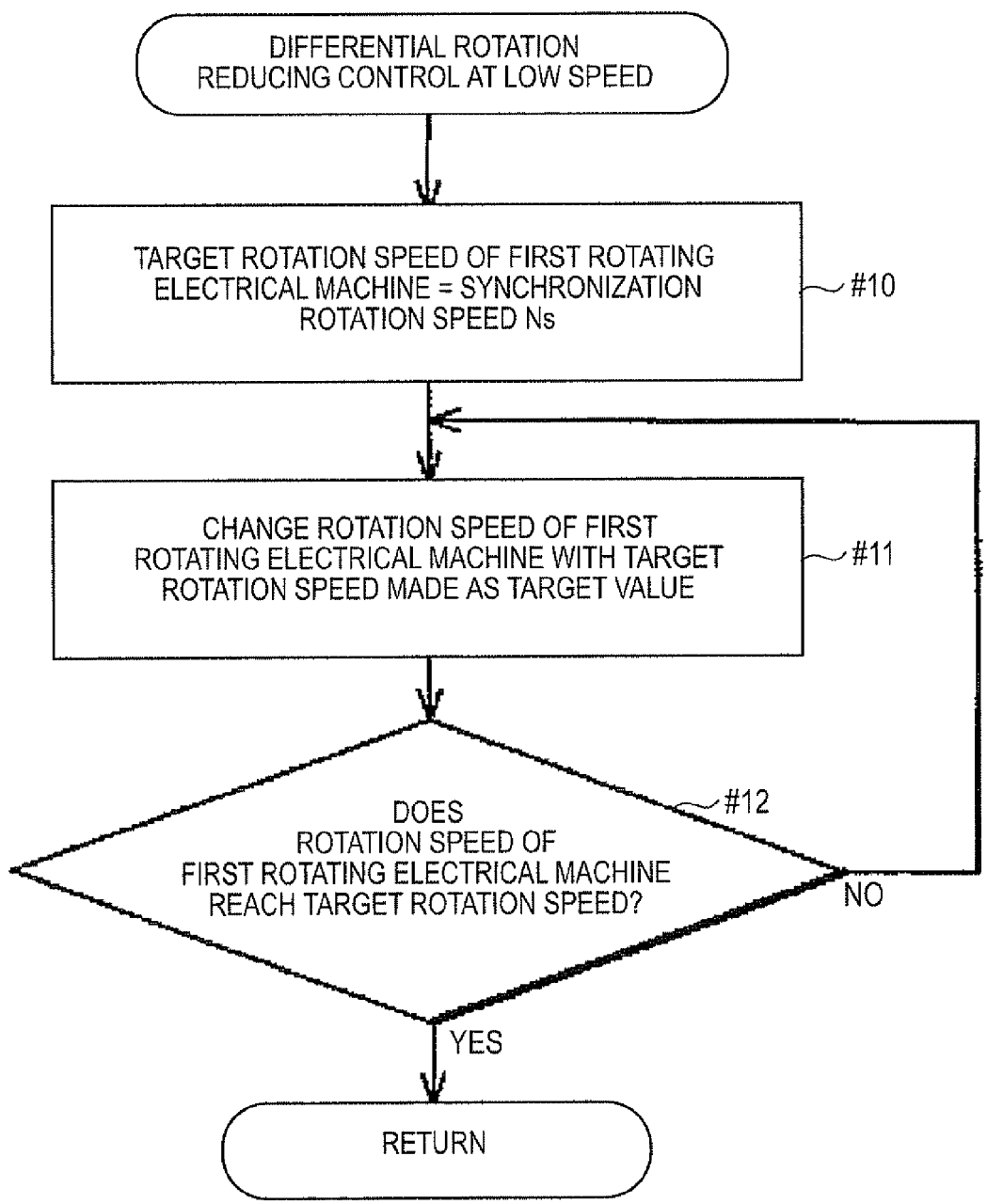
FIG. 11 is a flow chart illustrating a procedure of the differential rotation reducing control at a low speed according to the first embodiment of the invention.
Figure 12:
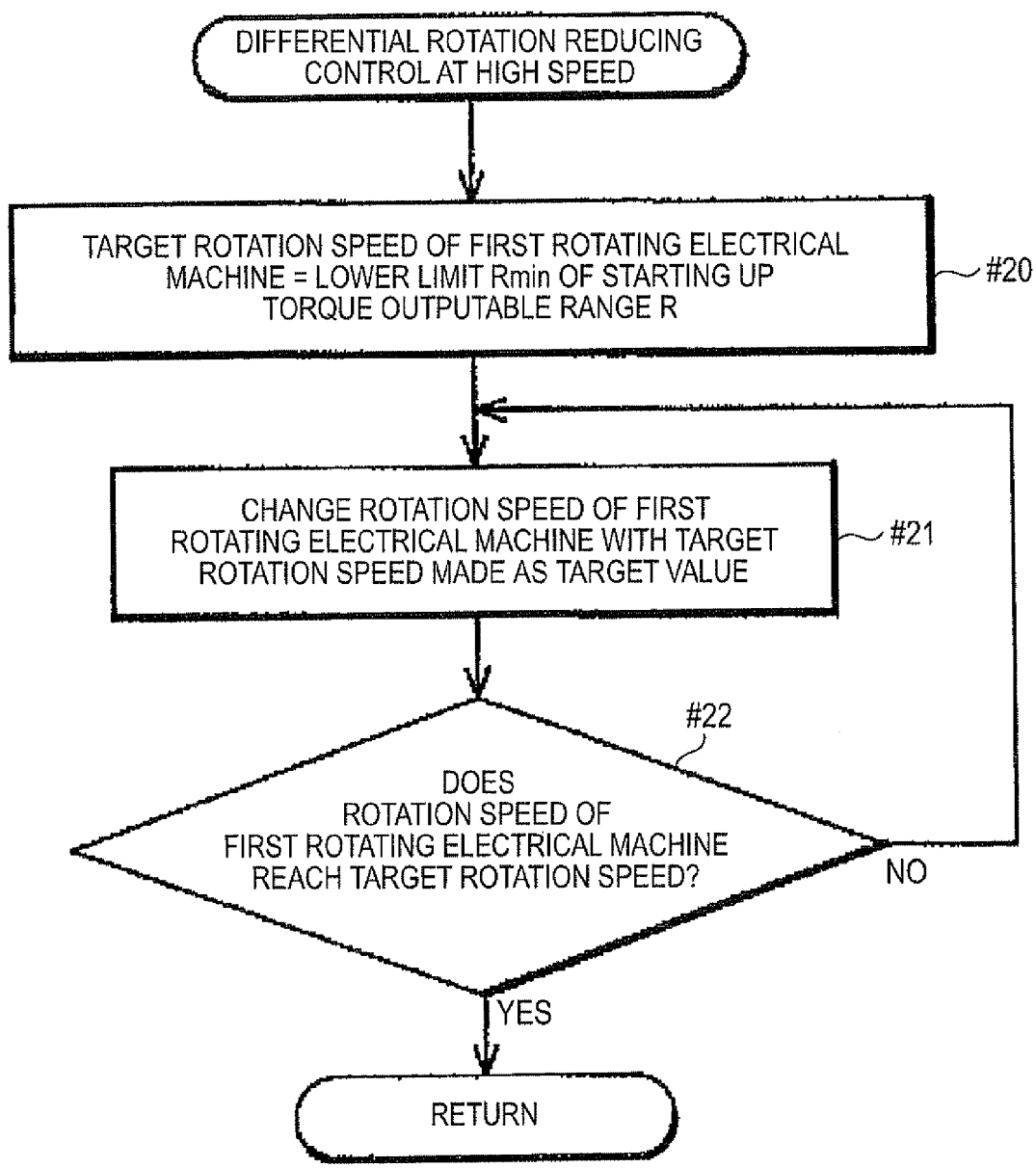
FIG. 12 is a flow chart illustrating a procedure of the differential rotation reducing control at a high speed according to the first embodiment of the invention.
Figure 13:
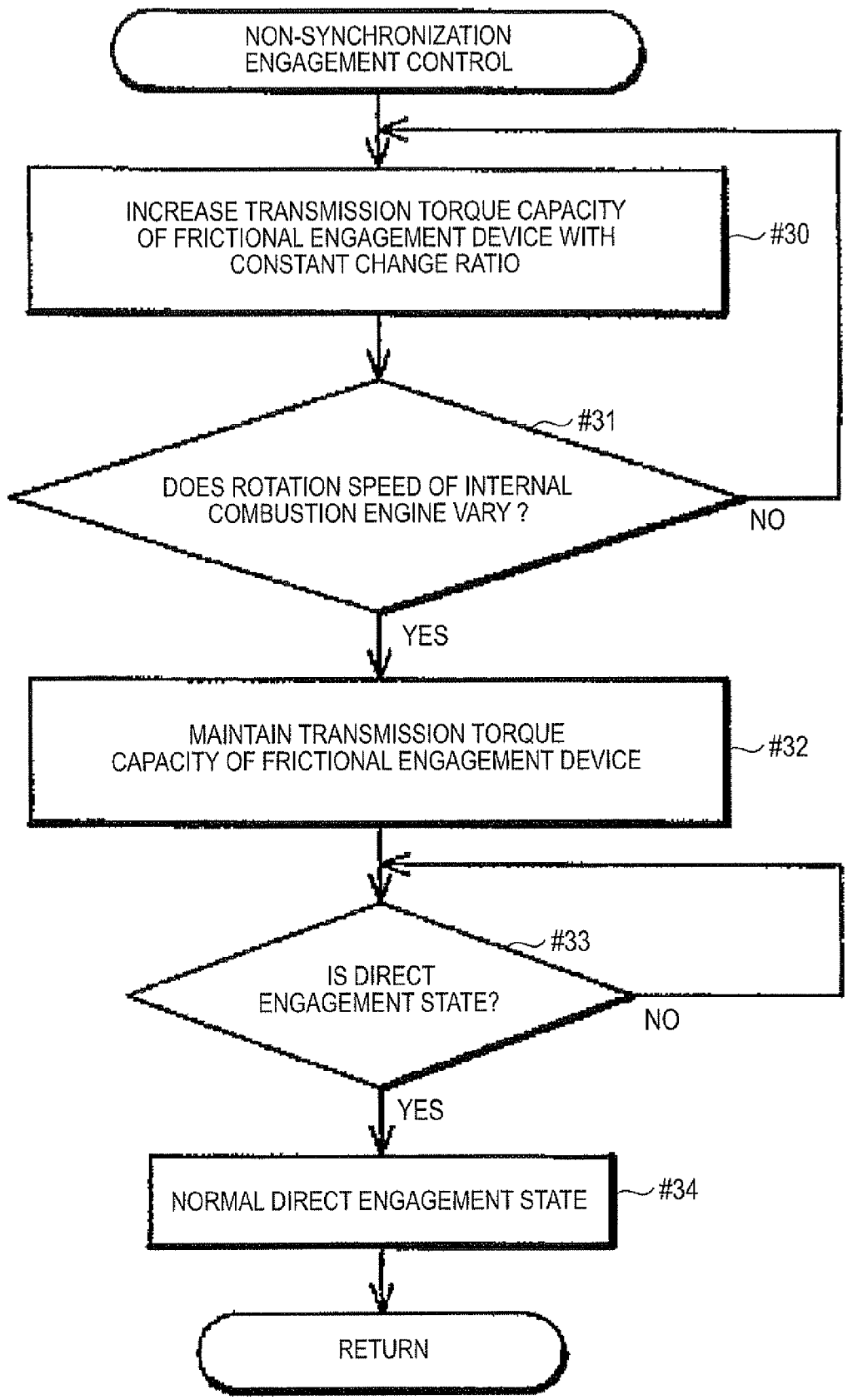
FIG. 13 is a flow chart illustrating a procedure of the non-synchronization engagement control according to the first embodiment of the invention.
Figure 14:
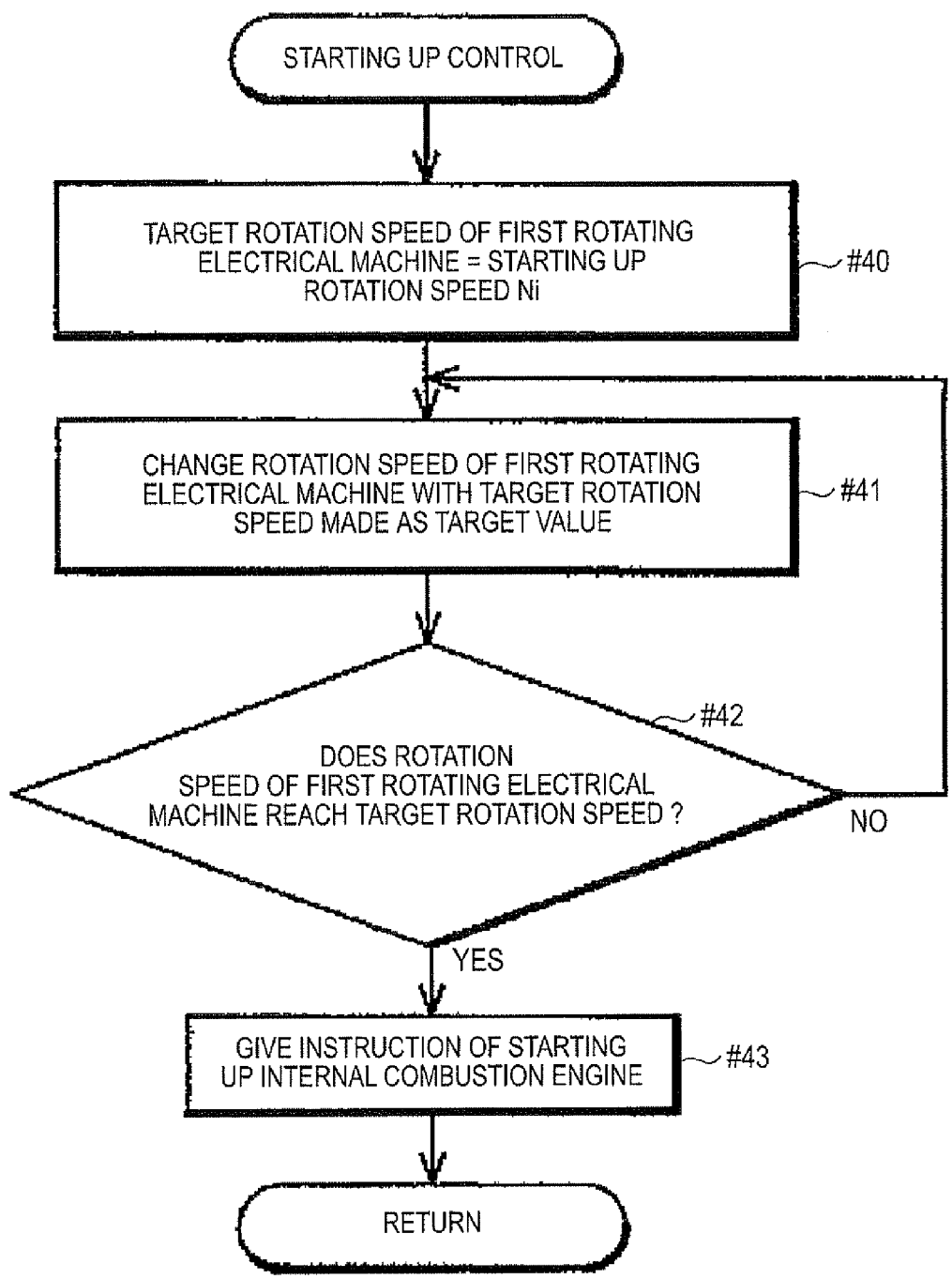
FIG. 14 is a flow chart illustrating a procedure of the starting up control according to the first embodiment of the invention.

Next, a procedure of the starting up control of the internal combustion engine according to this embodiment will be described with reference to flow charts in FIGS. 10 to 14. In addition, FIG. 10 shows a flow chart illustrating an overall procedure of an internal combustion engine starting up control. FIG. 11 shows a flow chart illustrating a procedure of the differential rotation reducing control at a low speed in step #04 in FIG. 10. FIG. 12 shows a flow chart illustrating a procedure of the differential rotation reducing control at a high speed in step #06 in FIG. 10. FIG. 13 shows a flow chart illustrating a procedure of the non-synchronization engagement control in step #07 in FIG. 10. FIG. 14 shows a flow chart illustrating a procedure of the starting up control in step #08 in FIG. 10. Respective procedures described below are performed by respective functional units of the control device 70. In a case where each of the respective functional units is configured by a program, an arithmetic operation processing unit provided to the control device 70 operates as a computer executing the program making up each of the functional units.

1-5-1. Overall Procedure of Starting Up Control of Internal Combustion Engine As shown in FIG. 10, during traveling in the electric traveling mode (step #01: Yes), when a request for the starting up of the internal combustion engine E is made (step #02: Yes), the target rotation speed setting unit 72 determines whether or not the synchronization rotation speed Ns that is a rotation speed of the first rotating electrical machine MG1, which allows the two engagement members (in this example, the internal combustion engine E and the carrier ca) of the frictional engagement device CL to be the synchronization state, is within the starting up torque outputable range R (step #03).

In a case where the synchronization rotation speed Ns is within the starting up torque outputable range R (step #03: Yes), the differential rotation reducing control at a low speed (step #04), the synchronization engagement control (step #05), and the starting up control (step #08) are sequentially performed. Details of the differential rotation reducing control at a low speed and the starting up control will be described later.

On the other hand, in a case where the synchronization rotation speed Ns is not within the starting up torque outputable range R (step #03: No), the differential rotation reducing control at a high speed (step #06), the non-synchronization engagement control (step #07), and the starting up control (step #08) are sequentially performed. Details of the differential rotation reducing control at a high speed and the non-synchronization engagement control will be described later.

1-5-2. Differential Rotation Reducing Control at Low Speed

Next, the differential rotation reducing control at a low speed in step #04 will be described with reference to FIG. 11. The target rotation speed setting unit 72 sets a target rotation speed of the first rotating electrical machine to the synchronization rotation speed Ns (step #10). The differential rotation reducing control unit 71 changes the rotation speed of the first rotating electrical machine MG with the target rotation speed (that is, the synchronization rotation speed Ns) set by the target rotation speed setting unit 72 made as a target value (step #11). In this example, in step #11, a rotation speed feedback control in which the synchronization rotation speed Ns is set as a target value is performed. The control in step #11 continues until the rotation speed of the first rotating electrical machine MG1 reaches the target rotation speed (step #12: No). Then, when the rotation speed of the first rotating electrical machine MG1 reaches the target rotation speed (step #12: Yes), the process is terminated.

1-5-3. Differential Rotation Reducing Control at High Speed

Next, the differential rotation reducing control at a high speed in step #06 will be described with reference to FIG. 12. The target rotation speed setting unit 72 sets the target rotation speed of the first rotating electrical machine to the lower limit Rmin of the starting up torque outputable range R (step #20). The differential rotation reducing control unit 71 changes the rotation speed of the first rotating electrical machine MG with the target rotation speed (that is, the lower limit Rmin of the starting up torque outputable range R) set by the target rotation speed setting unit 72 made as a target value (step #21). In this example, in step #21, a rotation speed feedback control in which the lower limit Rmin of the starting up torque outputable range R is set as a target value is performed. The control in step #21 continues until the rotation speed of the first rotating electrical machine MG1 reaches the target rotation speed (step #22: No). When the rotation speed of the first rotating electrical machine MG1 reaches the target rotation speed (step #22: Yes), the process is terminated.

1-5-4. Non-Synchronization Engagement Control

Next, the non-synchronization engagement control in step #07 will be described with reference FIG. 13. The non-synchronization engagement control unit 75 controls the hydraulic pressure instruction value with respect to the frictional engagement device CL so that the transmission torque capacity of the frictional engagement device CL increases from zero with a predetermined change ratio (in this example, a constant change ratio) (step #30). The control in step #30 continues until the rotation speed of the internal combustion engine E varies (step #31: No), and when the rotation speed of the internal combustion engine E varies (step #31: Yes), the hydraulic pressure instruction value with respect to the frictional engagement device CL is controlled so that the transmission torque capacity of the frictional engagement device CL is maintained to a value at that point of time (step #32). Then, the difference in the rotation speed between the carrier ca and the internal combustion engine E decreases with the passage of time after being in the slip engagement state, and after the carrier ea and the internal combustion engine E become the direct engagement state in which these integrally rotate (step #33: Yes), the hydraulic pressure instruction value with respect to the frictional engagement device CL is made to increase to the normal hydraulic pressure to allow the frictional engagement device CL to be the normal direct engagement state (step #34), and then the process is terminated.

1-5-5. Starting Up Control

Next, the starting up control in step #08 will be described with reference to FIG. 14. First, the target rotation speed of the first rotating electrical machine MG1 is set to the starting up rotation speed Ni that is a rotation speed of the first rotating electrical machine MG1 to allow the internal combustion engine E to have the ignition rotation speed Nf (step #40). Then, the rotation speed of the first rotating electrical machine MG1 is changed with the starting up rotation speed Ni made as a target value (step #41). In this example, in step #41, a rotation speed feedback control in which the starting up rotation speed Ni is set as a target value is performed. The control in step #41 continues until the rotation speed of the first rotating electrical machine MG1 reaches the target rotation speed (step #42: No). Then, when the rotation speed of the first rotating electrical machine MG1 reaches the target rotation speed (step #42: Yes), an instruction of starting up the internal combustion engine E is given with respect to the internal combustion engine control unit 3 (step #43), and then the process is terminated.

2. Second Embodiment

Figure 15:
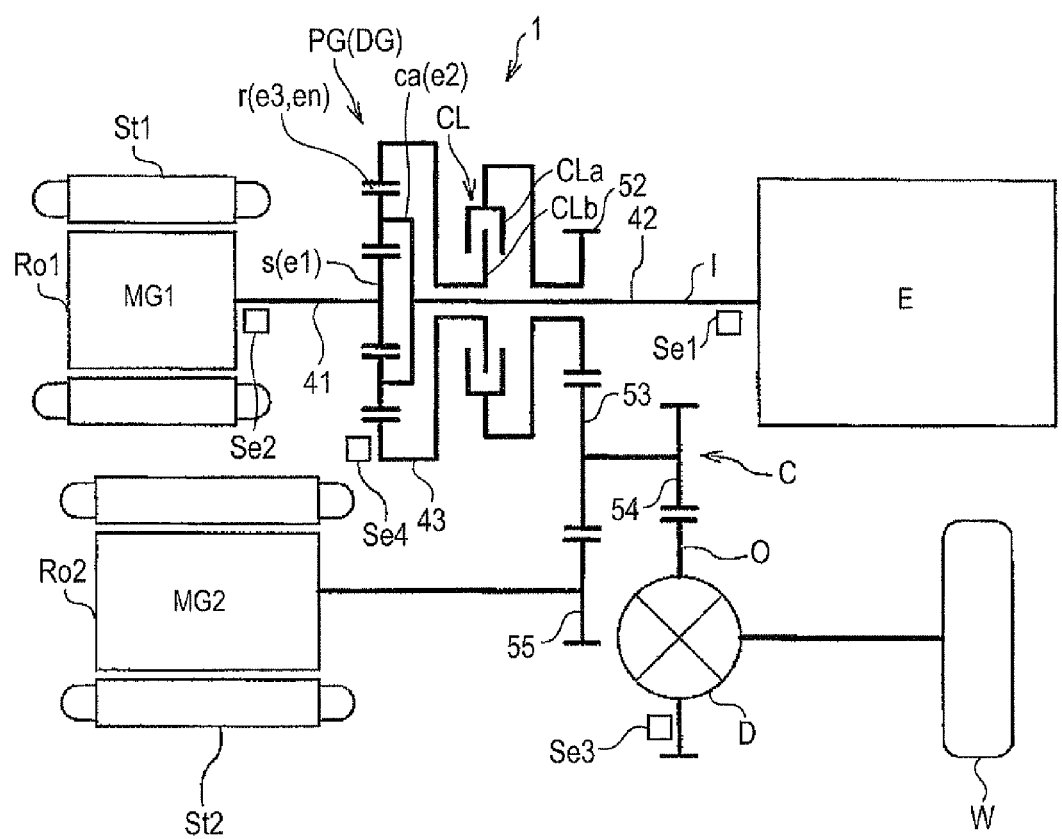
FIG. 15 is a skeleton diagram illustrating a mechanical configuration of a driving device for a vehicle according to a second embodiment of the invention.

Next, a second embodiment of the driving device for a vehicle according to the invention will be described with reference to FIGS. 15 and 16. As shown in FIG. 15, the driving device 1 for a vehicle according to this embodiment is configured basically with the same configuration as the first embodiment except for an arrangement position of the frictional engagement device CL. Hereinafter, a configuration of the driving device 1 for a vehicle according to this embodiment will be mainly described based on the differences from the first embodiment. In addition, it is assumed that configurations not specifically described are the same as the first embodiment.

As shown in FIG. 15, in the driving device 1 for a vehicle according to this embodiment, the frictional engagement device CL is provided at a power transmission path between the output member O and the rotational element (the third rotational element e3) of the differential gear unit DG, not between the input member I and the rotational element (the second rotational element e2) of the differential gear unit DG. Therefore, the frictional engagement device CL is provided in such a manner that the differential gear unit DG can release the connection in a driving manner between the output member O and the rotational element (the third rotational element e3) of the differential gear unit DG.

Specifically, the counter drive gear 52 is connected in a driving manner to the first engagement member CLa that is one engagement member of the frictional engagement device CL to rotate integrally therewith, and the third rotational element connecting member 43 is connected in a driving manner to the second engagement member CLb that is the other engagement member to rotate integrally therewith. Therefore, the frictional engagement device CL is located at a power transmission path between the second rotating electrical machine MG2 and the rotational element (the third rotational element e3) of the differential gear unit DG, and when the frictional engagement device CL is made to be released state, the connection in a driving manner between the second rotating electrical machine MG2 and the rotational element (the third rotational element e3) of the differential gear unit DG is released, in addition to the output member O.

In this embodiment, since the rotational element en that is an object to be released is the ring gear r, as shown in FIG. 15, the sensor Se4 for a rotational element that is an object to be released is disposed to detect a rotation speed of the ring gear r. In addition, in this embodiment, since the input member I is connected in a driving manner to the second rotational element connecting member 42 to rotate integrally therewith, the rotation speed of the carrier ca is always equal to the rotation speed of the internal combustion engine E.

Figure 16:
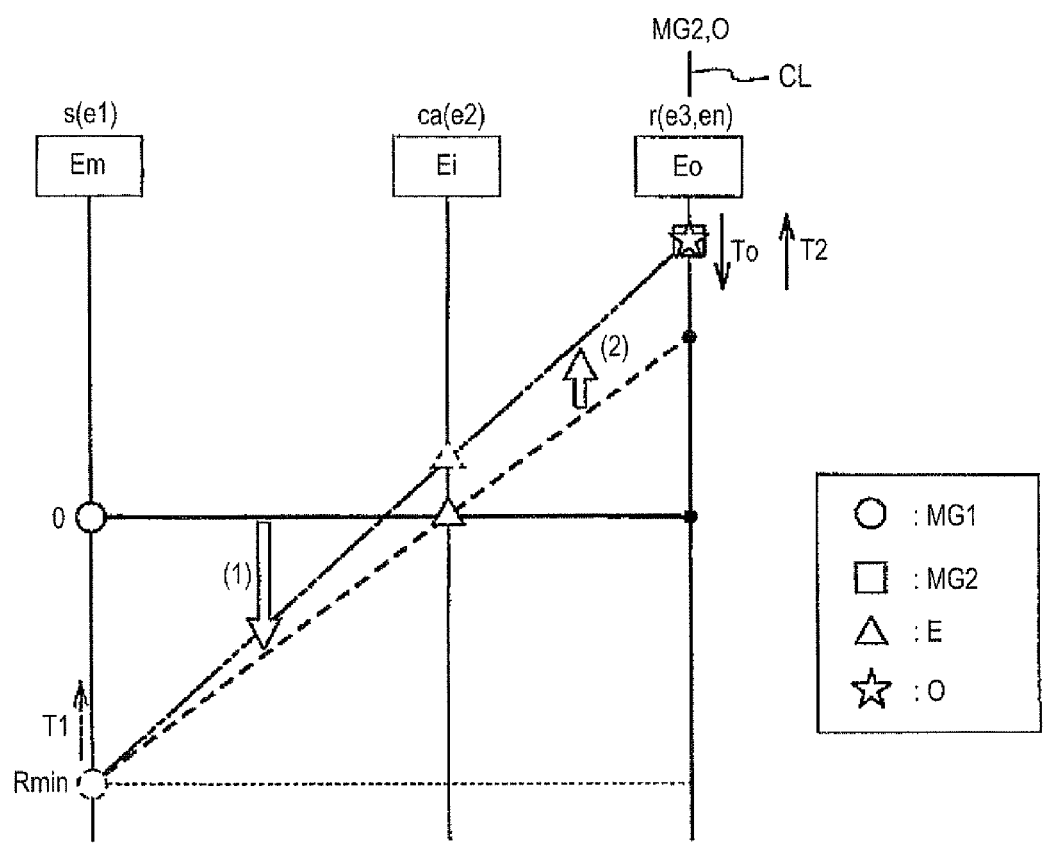
FIG. 16 is a speed diagram illustrating operations of a differential rotation reducing control at a high speed and a non-synchronization engagement control according to the second embodiment of the invention.

FIG. 16 shows a speed diagram illustrating operations of a differential rotation reducing control at a high speed and a non-synchronization engagement control according to this embodiment. As indicated by a solid line in FIG. 16, in a state in which a vehicle travels in an electric traveling mode, the frictional engagement device CL enters a released state, and the ring gear r is detached from the output member O and the second rotating electrical machine MG2 and therefore becomes a freely rotatable state. In addition, since the internal combustion engine E is in a stopped state, the rotation speed thereof becomes zero, and since the first rotating electrical machine MG1 is controlled in such a manner that the rotation speed and output torque thereof become zero, the rotation speed of the ring gear r becomes zero.

In addition, when the internal combustion engine E is attempted to be started up from the state indicated by the solid line in FIG. 16, the differential rotation reducing control is performed, and therefore the rotation speed of the first rotating electrical machine MG1 is made to vary in such a manner that a difference in the rotation speed between the ring gear r and the output member O (more specifically, a difference in the rotation speed between the ring gear r and the counter drive gear 52) decreases.

Here, as described above, on the speed diagram, the rotation speed of each member of the first rotating electrical machine MG1, the second rotating electrical machine MG2, the internal combustion engine E, and the output member O represents a rotation speed after converting the rotation speed (gear changing) by a power transmission member (excluding an engagement element that selectively transmits rotation and torque like the frictional engagement device CL) that is provided at a power transmission path to the rotational element (rotational element connecting member) of the differential gear unit DG. In the following description, in regard to the description made with reference to the speed diagram, it is assumed that the rotation speed of each member of the first rotating electrical machine MG1, the second rotating electrical machine MG2, the internal combustion engine E, and the output member O means a rotation speed after the conversion of the rotation speed by the above-described power transmission member as long as it is not particularly denied.

In this embodiment, the first rotating electrical machine MG1 outputs negative direction torque so as to gradually increase the rotation speed of the ring gear r, and thereby the rotation speed of the first rotating electrical machine MG1 is decreased (a process indicated by an arrow (1) in FIG. 16). In addition, FIG. 16 illustrates an example in which the synchronization rotation speed Ns is not present within the starting up torque outputable range R, and the differential rotation reducing control at a high speed is performed, such that a target rotation speed of the first rotating electrical machine MG1 in the differential rotation reducing control is set to the lower limit Rmin of the starting up torque outputable range R. A broken line in FIG. 16 illustrates a state in which the rotation speed of the first rotating electrical machine MG1 reaches the lower limit Rmin of the starting up torque outputable range R by the performing of the differential rotation reducing control at a high speed.

In addition, a non-synchronization engagement control is performed (a process indicated by an arrow (2) in FIG. 16) in a state where the rotation speed of the first rotating electrical machine MG1 reaches the lower limit Rmin of the starting up torque outputable range R, which is a target value, the rotation speed of the internal combustion engine E increases as the rotation speed of the ring gear r increases to the rotation speed of the output member O. Then, although not shown, the starting up control by the starting up control unit 77 is performed on condition that the frictional engagement device CL becomes the direct engagement state, and therefore the rotation speed of the internal combustion engine E reaches the ignition rotation speed Nf.

In addition, although not shown, with respect to a case in which the synchronization rotation speed Ns is present within the starting up torque outputable range R, and the differential rotation reducing control at a low speed is performed, as is the case with the first embodiment, the target rotation speed of the first rotating electrical machine in the differential rotation reducing control is set to the synchronization rotation speed Ns. In addition, the synchronization engagement control is performed in a state in which the rotation speed of the first rotating electrical machine MG1 reaches the synchronization rotation speed Ns that is a target value by the performing of the differential rotation reducing control at a low speed.

3. Third Embodiment

Figure 17:
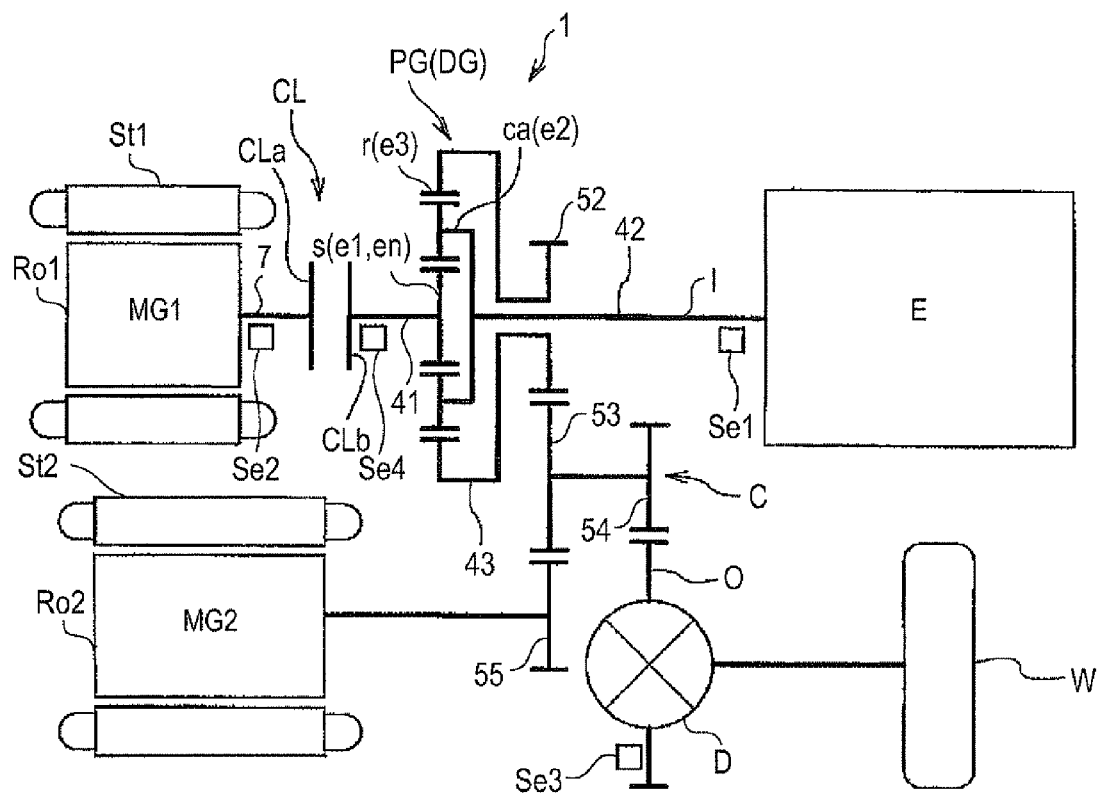
FIG. 17 is a skeleton diagram illustrating a mechanical configuration of a driving device for a vehicle according to a third embodiment of the invention.

Next, a third embodiment of the driving device for a vehicle according to the invention will be described with reference to FIGS. 17 and 18. As shown in FIG. 17, the driving device 1 for a vehicle according to this embodiment is configured basically with the same configuration as the first embodiment except for an arrangement position of the frictional engagement device CL. Hereinafter, a configuration of the driving device 1 for a vehicle according to this embodiment will be mainly described based on the differences from the first embodiment. In addition, it is assumed that the configurations not specifically described are the same as the first embodiment.

As shown in FIG. 17, the driving device 1 for a vehicle according to this embodiment, the frictional engagement device CL is provided at a power transmission path between the first rotating electrical machine MG1 and the rotational element (the first rotational element e1) of the differential gear unit DG, not between the input member I and the rotational element (the second rotational element e2) of the differential gear unit DG. Therefore, the frictional engagement device CL is provided in such a manner that the differential gear unit DG can release the connection in a driving manner between the first rotating electrical machine MG1 and the rotational element (the first rotational element e1) of the differential gear unit DG.

Specifically, a first rotor shaft 7 of the first rotating electrical machine MG1 is connected in a driving manner to the first engagement member CLa that is one engagement member of the frictional engagement device CL to rotate integrally therewith, and the first rotational element connecting member 41 is connected in a driving manner to the second engagement member CLb that is the other engagement member of the frictional engagement device CL to rotate integrally therewith. In this embodiment, since the rotational element en that is an object to be released is the sun gear s, as shown in FIG. 17, the sensor Se4 for a rotational element that is an object to be released is disposed to detect a rotation speed of the sun gear s. In addition, in this embodiment, since the input member I is connected in a driving manner to the second rotational element connecting member 42 to rotate integrally therewith, the rotation speed of the carrier ca is always equal to the rotation speed of the internal combustion engine E.

Figure 18:
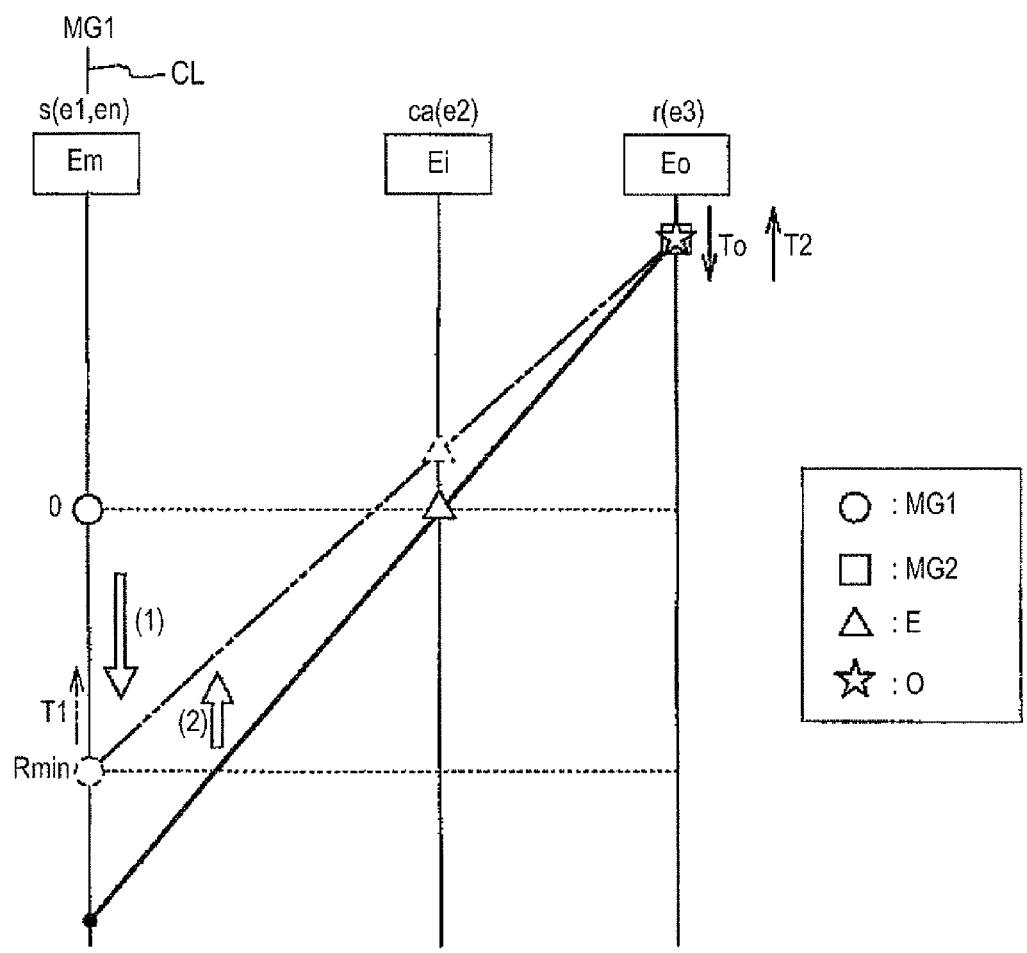
FIG. 18 is a speed diagram illustrating operations of a differential rotation reducing control at a high speed and a non-synchronization engagement control according to the third embodiment of the invention.

FIG. 18 shows a speed diagram illustrating operations of a differential rotation reducing control at a high speed and a non-synchronization engagement control according to this embodiment. As indicated by a solid line in FIG. 18, in a state in which a vehicle travels in an electric traveling mode, the frictional engagement device CL enters a released state, and the sun gear s is detached from the first rotating electrical machine MG1 and therefore becomes a freely rotatable state. In addition, since the internal combustion engine E is in a stopped state, the rotation speed thereof becomes zero, and the sun gear s rotates at a rotation speed determined based on the rotation speed (determined in response to a vehicle speed) of the ring gear r. At this time, the first rotating electrical machine MG1 is controlled in such a manner that the rotation speed and output torque thereof become zero.

In addition, when the internal combustion engine E is attempted to be started up from the state indicated by the solid line in FIG. 18, the differential rotation reducing control is performed, and therefore the rotation speed of the first rotating electrical machine MG1 is made to vary in such a manner that a difference in the rotation speed between the sun gear s and the first rotating electrical machine MG1 decreases. In this embodiment, the first rotating electrical machine MG1 outputs negative direction torque, and thereby the rotation speed of the first rotating electrical machine MG1 is decreased (a process indicated by an arrow (1) in FIG. 18). In addition, FIG. 18 illustrates an example in which the synchronization rotation speed Ns is not present within the starting up torque outputable range R, and the differential rotation reducing control at a high speed is performed, such that a target rotation speed of the first rotating electrical machine MG1 in the differential rotation reducing control is set to the lower limit Rmin of the starting up torque outputable range R. A circle of a broken line in FIG. 18, which indicates the first rotating electrical machine MG1, represents a state in which the rotation speed of the first rotating electrical machine MG1 reaches the lower limit Rmin of the starting up torque outputable range R by the performing of the differential rotation reducing control at a high speed.

In addition, a non-synchronization engagement control is performed (a process indicated by an arrow (2) in FIG. 18) in a state where the rotation speed of the first rotating electrical machine MG1 reaches the lower limit Rmin of the starting up torque outputable range R, which is a target value, the rotation speed of the internal combustion engine E increases as the rotation speed of the sun gear s increases to the rotation speed of the first rotating electrical machine MG1. Then, although not shown, the starting up control by the starting up control unit 77 is performed on condition that the frictional engagement device CL becomes the direct engagement state, and therefore the rotation speed of the internal combustion engine E reaches the ignition rotation speed Nf.

In addition, although not shown, with respect to a case in which the synchronization rotation speed Ns is present within the starting up torque outputable range R, and the differential rotation reducing control at a low speed is performed, as is the case with the first embodiment, the target rotation speed of the first rotating electrical machine in the differential rotation reducing control is set to the synchronization rotation speed Ns. In addition, the synchronization engagement control is performed in a state in which the rotation speed of the first rotating electrical machine MG1 reaches the synchronization rotation speed Ns that is a target value by the performing of the differential rotation reducing control at a low speed.

4. Fourth, Fifth, and Sixth Embodiments

In the above-described first, second, and third embodiments, description has been made with respect to a configuration in which the first rotating electrical machine MG1 is connected in a driving manner to the first rotational element e1, the input member I is connected in a driving manner to the second rotational element e2, and the second rotating electrical machine MG2 and the output member O are connected in a driving manner to the third rotational element e3, not through another rotational element of the differential gear unit DG, as an example. However, an embodiment of the invention is not limited thereto, and as shown in FIGS. 19 to 21, it may be configured that the input member I is connected in a driving manner to the first rotational element e1, the second rotating electrical machine MG2 and the output member O are connected in a driving manner to the second rotational element e2, and the first rotating electrical machine MG1 is connected in a driving manner to the third rotational element e3.

Figure 19:
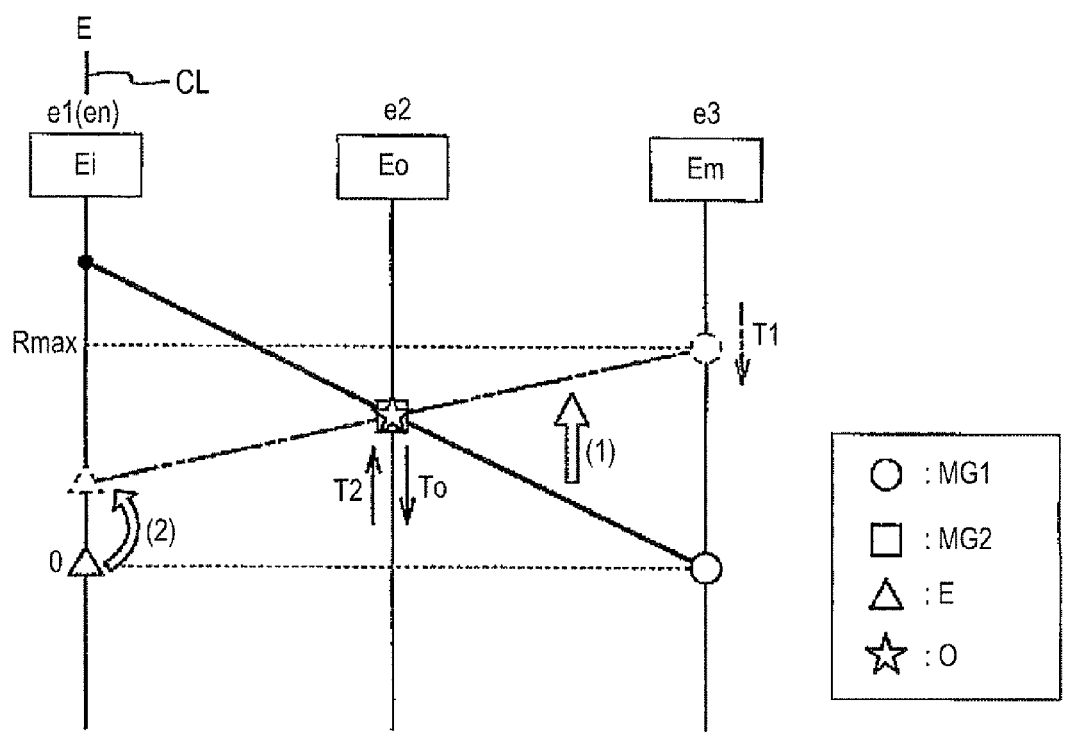
FIG. 19 is a speed diagram illustrating operations of a differential rotation reducing control at a high speed and a non-synchronization engagement control according to a fourth embodiment of the invention.
Figure 20:
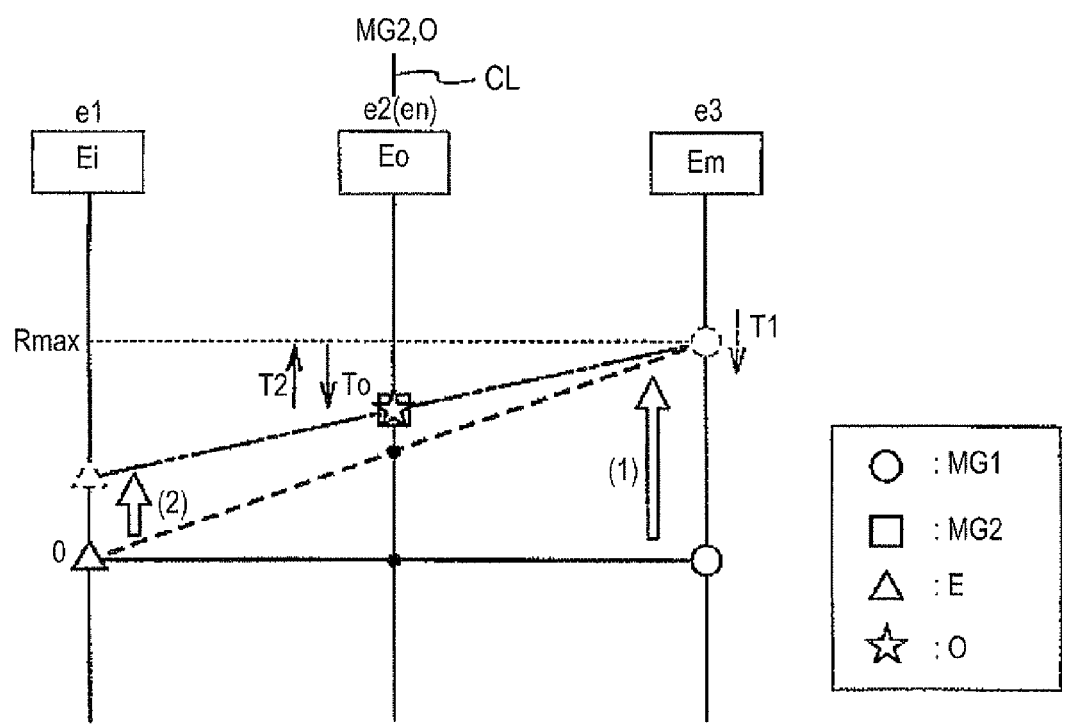
FIG. 20 is a speed diagram illustrating operations of a differential rotation reducing control at a high speed and a non-synchronization engagement control according to a fifth embodiment of the invention.
Figure 21:
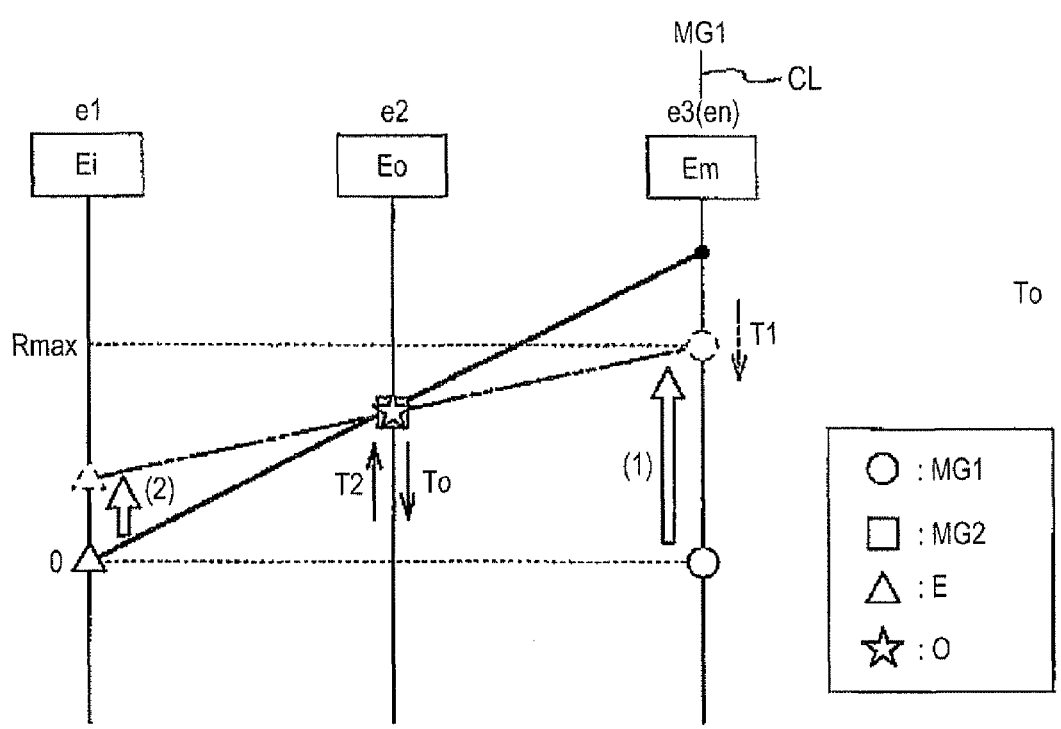
FIG. 21 is a speed diagram illustrating operations of a differential rotation reducing control at a high speed and a non-synchronization engagement control according to a sixth embodiment of the invention.

In examples shown in FIGS. 19 to 21, differently from the above-described first, second, and third embodiments, in the hybrid traveling mode in which traveling is performed with both output torque of the internal combustion engine E and output torque of the rotating electrical machines MG1 and MG2, basically, a torque converter mode in which torque amplified with respect to the output torque of the internal combustion engine E is transmitted to the output member O is realized.

FIG. 19 illustrates a fourth embodiment of the driving device for a vehicle according to the invention, and as is the case with the above-described first embodiment (FIG. 1, FIG. 4, and FIG. 5), the frictional engagement device CL is provided at a power transmission path between the input member I and the rotational element (in this example, the first rotational element e1) of the differential gear unit DG.

FIG. 20 illustrates a fifth embodiment of the driving device for a vehicle according to the invention, and as is the case with the second embodiment (FIG. 15 and FIG. 16), the frictional engagement device CL is provided at a power transmission path between the output member O and the rotational element (in this example, the second rotational element e2) of the differential gear unit DG.

FIG. 21 illustrates a sixth embodiment of the driving device for a vehicle according to the invention, and as is the case with the third embodiment (FIG. 17 and FIG. 18), the frictional engagement device CL is provided at a power transmission path between the first rotating electrical machine MG1 and the rotational element (in this example, the third rotational element e3) of the differential gear unit DG.

FIGS. 19 to 21 show speed diagrams illustrating operations of the differential rotation reducing control at a high speed and the non-synchronization engagement control that are performed in each embodiment. A notation method of the speed diagrams is the same as the above-described respective embodiments, such that detailed description thereof will not be repeated, but the respective speed diagrams illustrate a state of each member when the non-synchronization engagement control (a process indicated by an arrow (2) in each drawing) is performed after performing the differential rotation reducing control at a high speed (a process indicated by an arrow (1) in each drawing).

In addition, in examples shown in FIGS. 19 to 21, in the differential rotation reducing control, the first rotating electrical machine MG1 outputs positive direction torque to increase the rotation speed thereof. Therefore, a target rotation speed of the first rotating electrical machine MG1 in the differential rotation reducing control at a high speed is set to the upper limit Rmax of the starting up torque outputable range R. In addition, in the non-synchronization engagement control, the first rotating electrical machine MG1 outputs negative direction torque and maintains the rotation speed thereof, and in the starting up control, the first rotating electrical machine MG1 outputs negative direction torque and decreases the rotation speed thereof. Therefore, in configurations illustrated in FIGS. 19 to 21, the starting up torque outputable range R is set with the negative direction torque made as a reference.

5. Other Embodiments

Finally, other embodiments according to the invention will be described. In addition, characteristics disclosed in each of embodiments described later are applicable to other embodiments as long as a contradiction does not occur, instead of being applicable only to the corresponding embodiment.

(1) In the above-described respective embodiments, description has been made with respect to a configuration in which the differential gear unit DG includes three rotational elements, as an example. However, an embodiment of the invention is not limited thereto, and the differential gear unit DG may be configured to include four or more rotational elements. For example, as shown in FIGS. 22 and 23, the differential gear unit DG may be configured to include four rotational elements of a first rotational element e1, a second rotational element e2, a third rotational element e3, and a fourth rotational element e4 in the order of rotation speed.

Figure 22:
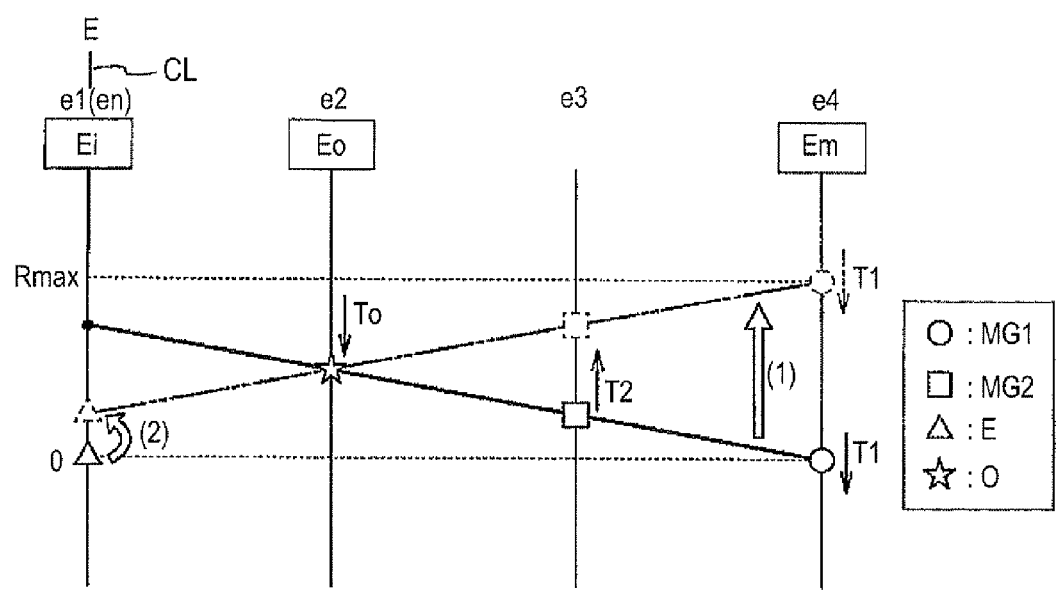
FIG. 22 is a speed diagram illustrating operations of a differential rotation reducing control at a high speed and a non-synchronization engagement control according to the other embodiments of the invention.
Figure 23:
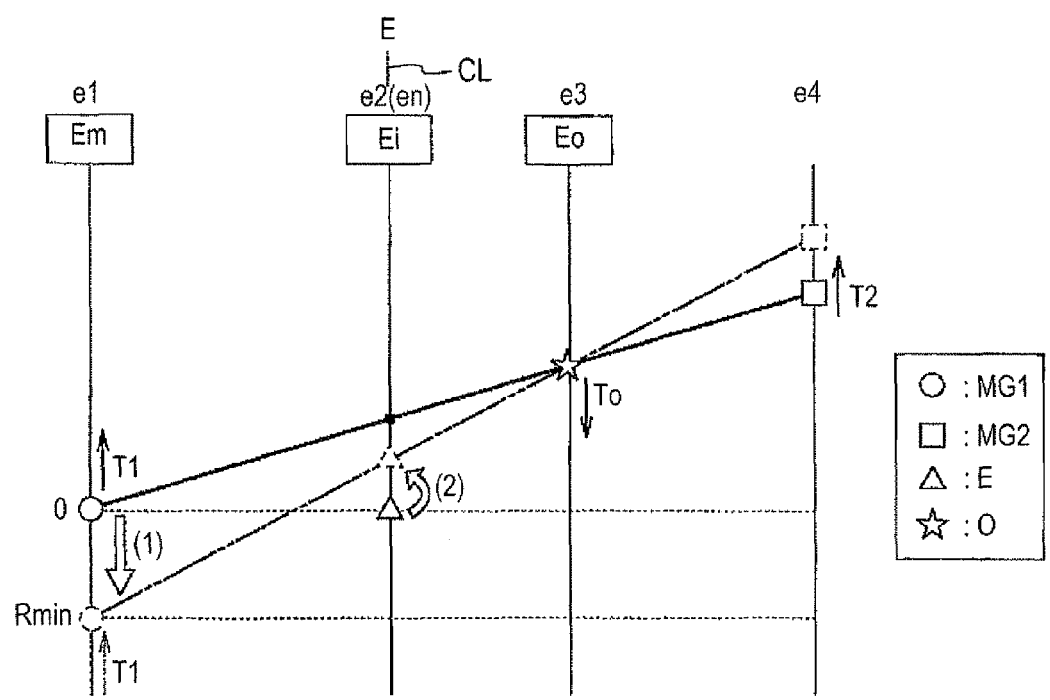
FIG. 23 is a speed diagram illustrating operations of a differential rotation reducing control at a high speed and a non-synchronization engagement control according to the other embodiments of the invention.

In an example illustrated in FIGS. 22 and 23, the input member I, the output member O, the first rotating electrical machine MG1, and the second rotating electrical machine MG2 are connected in a driving manner to the rotational elements, which are different from each other, of the differential gear unit DG, not through another rotational element of the differential gear unit DG. That is, in the examples illustrated in FIGS. 22 and 23, differently from the above-described respective embodiments, the second rotating electrical machine MG2 is connected in a driving manner to one of the rotational elements of the differential gear unit DG other than the rotational element to which the output member O is connected in a driving manner, not through another rotational element of the differential gear unit DG.

Specifically, in the example illustrated in FIG. 22, the input member I is connected in a driving manner to the first rotational element e1, the output member O is connected in a driving manner to the second rotational element e2, the second rotating electrical machine MG2 is connected in a driving manner to the third rotational element e3, and the first rotating electrical machine MG1 is connected in a driving manner to the fourth rotational element e4, not through another rotational element of the differential gear unit DG. In addition, in the example illustrated in FIG. 23, the first rotating electrical machine MG1 is connected in a driving manner to the first rotational element e1, the input member I is connected in a driving manner to the second rotational element e2, the output member O is connected in a driving manner to the third rotational element e3, and the second rotating electrical machine MG2 is connected in a driving manner to the fourth rotational element e4, not through another rotational element of the differential gear unit DG.

In the examples illustrated in FIGS. 22 and 23, the frictional engagement device CL is provided at the power transmission path between the input member I and the rotational element, to which the input member I is connected in a driving manner not through another rotational element, of the differential gear unit DG. In addition, even in this configuration, as is the case with the above-described respective embodiments, the non-synchronization engagement control (a process indicated by an arrow (2) in each drawing) is performed after performing the differential rotation reducing control at a high speed (a process indicated by an arrow (1) in each drawing), and thereby the starting up control of the internal combustion engine E may be performed.

(2) In the above-described respective embodiments, description has been made with respect to a configuration in which in the differential rotation reducing control at a high speed, the target rotation speed of the first rotating electrical machine MG1 is set to one of the upper limit Rmax and the lower limit Rmin of the starting up torque outputable range R, as an example. However, an embodiment of the invention is not limited thereto, and in the differential rotation reducing control at a high speed, the target rotation speed of the first rotating electrical machine MG1 may be set a rotation speed which is within the starting up torque outputable range R and which is deviated from the upper limit Rmax or the lower limit Rmin by a predetermined rotation speed. That is, in a case where the synchronization rotation speed Ns of the first rotating electrical machine MG1 is not within the starting up torque outputable range R, the non-synchronization engagement control may be performed without changing the rotation speed of the first rotating electrical machine MG1 up to the upper limit Rmax or the lower limit Rmin of the starting up torque outputable range R.

(3) In the above-described respective embodiments, description has been made with respect to a configuration in which in a case where the synchronization rotation speed Ns of the first rotating electrical machine MG1 is within the starting up torque outputable range R, the synchronization rotation speed Ns is set as the target rotation speed of the first rotating electrical machine MG1 in the differential rotation reducing control, as an example. However, an embodiment of the invention is not limited thereto, and even when the synchronization rotation speed Ns of the first rotating electrical machine MG1 is within the starting up torque outputable range R, the non-synchronization engagement control may be performed instead of the synchronization engagement control without changing the rotation speed of the first rotating electrical machine MG1 up to the synchronization rotation speed Ns.

(4) In the above-described respective embodiments, description has been made with respect to a configuration in which in the non-synchronization engagement control, the transmission torque capacity to maintain the frictional engagement device CL in the slip engagement state is maintained to a value at the point of time at which a difference in the rotation speed between the two engagement members of the frictional engagement device CL is found, as an example. However, an embodiment of the invention is not limited thereto, and a configuration in which the non-synchronization engagement control unit 75 sets the transmission torque capacity (target transmission torque capacity) of the frictional engagement device CL to allow the frictional engagement device CL to be the slip engagement state based on a target change ratio of the rotation speed of the internal combustion engine E and an inertia moment of the internal combustion engine E may be a very appropriate embodiment of the invention.

For example, the target transmission torque capacity to allow the frictional engagement device CL to be the slip engagement state may be set to a value according to a product of the target change ratio of the rotation speed of the internal combustion engine E and the inertia moment of the internal combustion engine E. In this configuration, when changing the engagement state of the frictional engagement device CL from the released state to the slip engagement state, the hydraulic pressure instruction value with respect to the frictional engagement device CL may be controlled so that the transmission torque capacity of the frictional engagement device CL increases with a predetermined change ratio (for example, a constant change ratio) up to the target transmission torque capacity set as described.

(5) In the above-described respective embodiments, description has been made with respect to a configuration in which the starting up torque outputable range R is set to be variable in response to the state of the electricity storage device B, as an example. However, an embodiment of the invention is not limited thereto, and the starting up torque outputable range R may be set in a fixed range not depending on the state of the electricity storage device B.

(6) In the above-described first, second, and third embodiments, description has been made with respect to a configuration in which the differential gear unit DG is configured by the planetary gear mechanism PG of a single-pinion type, as an example. However, an embodiment of the invention is not limited thereto, and the differential gear unit DG may be configured by a double-pinion-type planetary gear mechanism or a Ravigneaux-type planetary gear mechanism. In addition, even in the respective embodiments (excluding the first, second, and third embodiments) in which a specific configuration of the differential gear unit DG is not illustrated, as a configuration of the differential gear unit DG, an arbitrary mechanism may be adopted. For example, the differential gear unit DG including four or more rotational elements may use a configuration in which some rotational elements of the planetary gear mechanism of two sets or more are connected to each other, or the like.

(7) In the above-described respective embodiments, description has been made with respect to a configuration in which the frictional engagement device CL is configured by a frictional engagement device that operates by hydraulic pressure, as an example. However, an embodiment of the invention is not limited thereto, and an electromagnetic-type frictional engagement device in which an engagement pressure is controlled in response to an electromagnetic force may be adopted as the frictional engagement device CL.

(8) In the above-described respective embodiments, description has been made with respect to a configuration in which the internal combustion engine control unit 3 is provided separately from the control device 70, as an example. However, an embodiment of the invention is not limited thereto, and a configuration in which the internal combustion engine control unit 3 is unified to the control device 70 is possible. In addition, the allocation of the functional units described in the respective embodiments is a simple example, and a combination of a plurality of functional units or a further classification of one functional unit is possible.

(9) In regard to the above-described other configurations, embodiments disclosed in this specification are illustrative only in all aspects, and an embodiment of the invention is not limited thereto. That is, of course, configurations obtained by appropriately modifying some configurations not described in the claims belong to the technical scope of the invention as long as the configurations described in the claims of the present application and configurations equivalent to these are provided.

The invention may be appropriately used as a driving device for a vehicle, which includes an input member that is connected in a driving manner to an internal combustion engine, an output member that is connected in a driving manner to wheels, a first rotating electrical machine, a second rotating electrical machine, a differential gear unit having at least three rotational elements, and a control device.

What is claimed is:

1. A driving device for a vehicle, which is provided with an input member that is connected in a driving manner to an internal combustion engine, an output member that is connected in a driving manner to wheels, a first rotating electrical machine, a second rotating electrical machine, a differential gear unit including at least three rotational elements, and a control device,
wherein the input member, the output member, and the first rotating electrical machine are connected in a driving manner to the rotational elements, which are different from each other, of the differential gear unit, not through another rotational element of the differential gear unit;
the second rotating electrical machine is connected in a driving manner to one of the rotational elements of the differential gear unit other than the rotational element to which the first rotating electrical machine is connected in a driving manner, not through another rotational element of the differential gear unit;
the driving device includes a frictional engagement device that is capable of releasing the connection in a driving manner between any of the input member, the output member, and the first rotating electrical machine, and the rotational elements of the differential gear unit;
the control device includes,
a differential rotation reducing control unit that performs a differential rotation reducing control to change a rotation speed of the first rotating electrical machine in such a manner that the difference in the rotation speed between two engagement members, which engage with each other, in the frictional engagement device becomes small, when the internal combustion engine is started up from a state in which the frictional engagement device enters a released state, the internal combustion engine is stopped, and the output member rotates,
an engagement control unit that performs a non-synchronization engagement control that allows the frictional engagement device to engage, in a non-synchronization state in which the difference in the rotation speed between the two engagement members is equal to or greater than a threshold value of the differential rotation, on condition of the performing of the differential rotation reducing control, and that allows the frictional engagement device to be a direct engagement state that is an engagement state in which the differential rotation is not present between the two engagement members, and
a starting up control unit that changes the rotation speed of the first rotating electrical machine with a rotation speed of the first rotating electrical machine, which allows the internal combustion engine to have a rotation speed at which the starting up is possible, made as a target value, on condition of being in the direct engagement state; and
the differential rotation reducing control unit changes the rotation speed of the first rotating electrical machine with the upper limit and the lower limit of a starting up torque outputable range, which is a rotation speed range in which the starting up torque necessary for the starting up of the internal combustion engine may be output by the first rotating electrical machine, made as limits.

2. The driving device for a vehicle according to claim 1, wherein in a case where the rotation speed of the first rotating electrical machine, which is to realize a synchronization state in which the difference in the rotation speed between the two engagement members is less than the threshold value of the differential rotation, is beyond the upper limit or the lower limit,
the differential rotation reducing control unit changes the rotation speed of the first rotating electrical machine with one of the upper limit and the lower limit made as the target value.

3. The driving device for a vehicle according to claim 2, wherein in a case where the rotation speed of the first rotating electrical machine, which is to realize the synchronization state in which the difference in the rotation speed between the two engagement members is less than the threshold value of the differential rotation, is within the starting up torque outputable range,
the differential rotation reducing control unit changes the rotation speed of the first rotating electrical machine so as to realize the synchronization state, and the engagement control unit performs a synchronization engagement control, which allows the frictional engagement device to engage in the synchronization state instead of the non-synchronization engagement control, so as to make the frictional engagement device become the direct engagement state.

4. The driving device for a vehicle according to claim 3, wherein as the non-synchronization engagement control, the engagement control unit reduces the difference in the rotation speed between the two engagement members in a slip engagement state in which the two engagement members engage with each other with the difference in the rotation speed present, and performs a control to realize the direct engagement state, on condition of being in the synchronization state in which the difference in the rotational speed between the two engagement members is less than the threshold value of the differential rotation.

5. The driving device for a vehicle according to claim 4, wherein the engagement control unit sets a transmission torque capacity of the frictional engagement device, which allows the frictional engagement device to be the slip engagement state, on the basis of a target change ratio of the rotation speed of the internal combustion engine and an inertia moment of the internal combustion engine.

6. The driving device for a vehicle according to claim 5, wherein the first rotating electrical machine is configured to generate torque by electric power supplied from an electricity storage device, and is configured in such a manner that the maximum torque, which may be generated in response to the rotational speed of the first rotating electrical, machine and a state of the electricity storage device, becomes different in each case, and
the starting up torque outputable range is set to be variable in response to the state of the electricity storage device.

7. The driving device for a vehicle according to claim 6, wherein the second rotating electrical machine is connected in a driving manner to the rotational element, to which the output member is connected in a driving manner, of the differential gear unit, not through another rotational element of the differential gear unit.

8. The driving device for a vehicle according to claim 7, wherein the differential gear unit includes three rotational elements that are a first rotational element, a second rotational element, and a third rotational element in the order of rotation speed,
the first rotating electrical machine is connected in a driving manner to the first rotational element, the input member is connected in a driving manner to the second rotational element, and the second rotating electrical machine and the output member are connected in a driving manner to the third rotational element, not through another rotational element of the differential gear unit, and the frictional engagement device is provided in a power transmission path between the input member and the second rotational element.

9. The driving device for a vehicle according to claim 2, wherein as the non-synchronization engagement control, the engagement control unit reduces the difference in the rotation speed between the two engagement members in a slip engagement state in which the two engagement members engage with each other with the difference in the rotation speed present, and performs a control to realize the direct engagement state, on condition of being in the synchronization state in which the difference in the rotational speed between the two engagement members is less than the threshold value of the differential rotation.

10. The driving device for a vehicle according to claim 2, wherein the first rotating electrical machine is configured to generate torque by electric power supplied from an electricity storage device, and is configured in such a manner that the maximum torque, which may be generated in response to the rotational speed of the first rotating electrical machine and a state of the electricity storage device, becomes different in each case, and the starting up torque outputable range is set to be variable in response to the state of the electricity storage device.

11. The driving device for a vehicle according to claim 2, wherein the second rotating electrical machine is connected in a driving manner to the rotational element, to which the output member is connected in a driving manner, of the differential gear unit, not through another rotational element of the differential gear unit.

12. The driving device for a vehicle according to claim 2, wherein the differential gear unit includes three rotational elements that are a first rotational element, a second rotational element, and a third rotational element in the order of rotation speed, the first rotating electrical machine is connected in a driving manner to the first rotational element, the input member is connected in a driving manner to the second rotational element, and the second rotating electrical machine and the output member are connected in a driving manner to the third rotational element, not through another rotational element of the differential gear unit, and the frictional engagement device is provided in a power transmission path between the input member and the second rotational element.

13. The driving device for a vehicle according to claim 2, wherein the differential gear unit includes four rotational elements that are a first rotational element, a second rotational element, a third rotational element, and a fourth rotational element in the order of rotation speed, the input member, the output member, the first rotating electrical machine, and the second rotating electrical machine are connected in a driving manner to the rotational elements, which are different from each other, of the differential gear unit, not through another rotational element of the differential gear unit, and the frictional engagement device is provided in a power transmission path between the input member and the rotational element, to which the input member is connected in a driving manner not through another rotational element, of the differential gear unit.

14. The driving device for a vehicle according to claim 1, wherein the differential gear unit includes four rotational elements that are a first rotational element, a second rotational element, a third rotational element, and a fourth rotational element in the order of rotation speed, the input member, the output member, the first rotating electrical machine, and the second rotating electrical machine are connected in a driving manner to the rotational elements, which are different from each other, of the differential gear unit, not through another rotational element of the differential gear unit, and the frictional engagement device is provided in a power transmission path between the input member and the rotational element, to which the input member is connected in a driving manner not through another rotational element, of the differential gear unit.

15. The driving device for a vehicle according to claim 1, wherein in a case where the rotation speed of the first rotating electrical machine, which is to realize the synchronization state in which the difference in the rotation speed between the two engagement members is less than the threshold value of the differential rotation, is within the starting up torque outputable range, the differential rotation reducing control unit changes the rotation speed of the first rotating electrical machine so as to realize the synchronization state, and the engagement control unit performs a synchronization engagement control, which allows the frictional engagement device to engage in the synchronization state instead of the non-synchronization engagement control, so as to make the frictional engagement device become the direct engagement state.

16. The driving device for a vehicle according to claim 15, wherein as the non-synchronization engagement control, the engagement control unit reduces the difference in the rotation speed between the two engagement members in a slip engagement state in which the two engagement members engage with each other with the difference in the rotation speed present, and performs a control to realize the direct engagement state, on condition of being in the synchronization state in which the difference in the rotational speed between the two engagement members is less than the threshold value of the differential rotation.

17. The driving device for a vehicle according to claim 1, wherein as the non-synchronization engagement control, the engagement control unit reduces the difference in the rotation speed between the two engagement members in a slip engagement state in which the two engagement members engage with each other with the difference in the rotation speed present, and performs a control to realize the direct engagement state, on condition of being in the synchronization state in which the difference in the rotational speed between the two engagement members is less than the threshold value of the differential rotation.

18. The driving device for a vehicle according to claim 1, wherein the first rotating electrical machine is configured to generate torque by electric power supplied from an electricity storage device, and is configured in such a manner that the maximum torque, which may be generated in response to the rotational speed of the first rotating electrical machine and a state of the electricity storage device, becomes different in each case, and the starting up torque outputable range is set to be variable in response to the state of the electricity storage device.

19. The driving device for a vehicle according to claim 1, wherein the second rotating electrical machine is connected in a driving manner to the rotational element, to which the output member is connected in a driving manner, of the differential gear unit, not through another rotational element of the differential gear unit.

20. The driving device for a vehicle according to claim 1, wherein the differential gear unit includes three rotational elements that are a first rotational element, a second rotational element, and a third rotational element in the order of rotation speed, the first rotating electrical machine is connected in a driving manner to the first rotational element, the input member is connected in a driving manner to the second rotational element, and the second rotating electrical machine and the output member are connected in a driving manner to the third rotational element, not through another rotational element of the differential gear unit, and the frictional engagement device is provided in a power transmission path between the input member and the second rotational element.

* * * * *